United States Patent
Hoshino et al.

(10) Patent No.: US 8,580,012 B2
(45) Date of Patent: Nov. 12, 2013

(54) SOLVENT-RESISTANT ASYMMETRIC HOLLOW FIBER GAS SEPARATION MEMBRANE, AND METHOD FOR PRODUCTION THEREOF

(75) Inventors: Harutoshi Hoshino, Chiba (JP); Tomonori Kanougi, Chiba (JP); Toshimune Yoshinaga, Chiba (JP); Yoji Kase, Chiba (JP); Kenji Fukunaga, Chiba (JP)

(73) Assignee: Ube Industries, Ltd. (JP)

( * ) Notice: Subject to any disclaimer, the term of this patent is extended or adjusted under 35 U.S.C. 154(b) by 436 days.

(21) Appl. No.: 12/863,125

(22) PCT Filed: Jan. 19, 2009

(86) PCT No.: PCT/JP2009/050672
§ 371 (c)(1),
(2), (4) Date: Jul. 15, 2010

(87) PCT Pub. No.: WO2009/091062
PCT Pub. Date: Jul. 23, 2009

(65) Prior Publication Data
US 2011/0048229 A1    Mar. 3, 2011

(30) Foreign Application Priority Data
Jan. 18, 2008  (JP) ............... 2008-009683

(51) Int. Cl.
*B01D 53/22* (2006.01)
*B01D 71/64* (2006.01)

(52) U.S. Cl.
USPC .......... 95/50; 95/45; 96/8; 96/10; 96/12; 96/13; 521/183

(58) Field of Classification Search
USPC ........... 95/45, 50, 51, 54; 96/4, 8, 10, 11, 12, 96/13; 521/183
See application file for complete search history.

(56) References Cited

U.S. PATENT DOCUMENTS

2006/0231485 A1 * 10/2006 Yoshinaga et al. ............ 96/4
2008/0017029 A1    1/2008 Kase et al.

FOREIGN PATENT DOCUMENTS

| EP | 0 446 947 A2 | 9/1991 |
|---|---|---|
| EP | 0 446 947 A3 | 9/1991 |
| EP | 0446947 A2 * | 9/1991 |
| JP | A-H03-267130 | 11/1991 |
| JP | 6-254367 * | 9/1994 |
| JP | A-H06-254367 | 9/1994 |
| JP | 2004-267810 * | 9/2004 |
| JP | A-2004-267810 | 9/2004 |
| JP | A-2006-224097 | 8/2006 |
| JP | A-2006-224098 | 8/2006 |
| JP | A-2007-063172 | 3/2007 |
| JP | A-2008-043945 | 2/2008 |

OTHER PUBLICATIONS

International Search Report issued in corresponding PCT Application No. PCT/JP2009/050672, mailed Sep. 10, 2010.
International Preliminary Report on Patentability and Written Opinion corresponding to PCT Application No. PCT/JP2009/050672, mailed Jun. 17, 2010.
Extended European Search Report in corresponding European Patent Application No. 09702838.5, mailed Jul. 11, 2011.

* cited by examiner

*Primary Examiner* — Jason M Greene
(74) *Attorney, Agent, or Firm* — Knobbe Martens Olson & Bear LLP

(57) ABSTRACT

An asymmetric hollow fiber gas separation membrane obtained by subjecting an asymmetric hollow fiber polyimide membrane to a heat treatment having a maximum temperature of from 350 to 450° C., wherein the asymmetric hollow fiber polyimide membrane is formed with a polyimide essentially having a repeating unit represented by a general formula (1);

general formula (1)

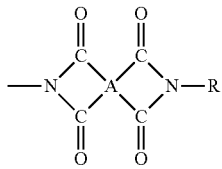

is excellent in a solvent resistance and a thermal stability, and as well has such a mechanical strength that a tensile elongation at break is not less than 10% as a hollow fiber membrane. In the general formula (1), 20 to 80 mol % of A is a tetravalent unit based on a biphenyl structure represented by formula (2), 20 to 80 mol % of A is a tetravalent unit based on a diphenyl-hexafluoropropane structure represented by formula (3), and 0 to 30 mol % of A is a tetravalent unit based on a phenyl structure represented by formula (4); and in the general formula (1), 30 to 70 mol % of R is a divalent unit represented by formula (5) and/or formula (6), and 30 to 70 mol % of R is a divalent unit having one or two other aromatic rings than formula (5) or (6), formula (2)

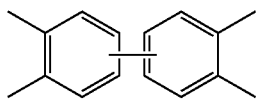

formula (3)

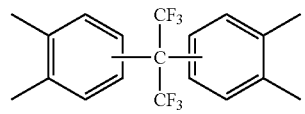

formula (4)

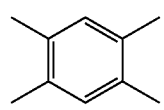

formula (5)

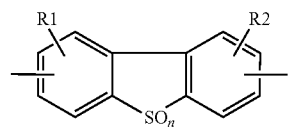

wherein, R1 and R2 are a hydrogen atom or an organic group, and n is 0, 1 or 2, formula (6)

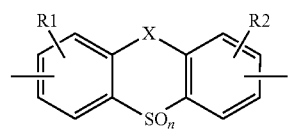

wherein, R1 and R2 are a hydrogen atom or an organic group, X is —CH$_2$— or —CO—, and n is 0, 1 or 2.

8 Claims, 6 Drawing Sheets

SOLVENT-RESISTANT ASYMMETRIC HOLLOW FIBER GAS SEPARATION MEMBRANE, AND METHOD FOR PRODUCTION THEREOF

This application is the U.S. National Phase under 35 U.S.C. §371 of International Application PCT/JP2009/050672, filed Jan. 19, 2009, designating the U.S., and published in Japanese as WO2009/091062 on Jul. 23, 2009, which claims priority to Japanese Patent Application No. 2008-009683, filed Jan. 18, 2008.

TECHNICAL FIELD

The present invention relates to an asymmetric hollow fiber gas separation membrane, which has been subjected to thermal infusibilization treatment through heat treatment and has solvent resistance. This membrane has excellent mechanical strength despite it is obtained by heat treatment for infusibilization of an asymmetric hollow fiber polyimide membrane to impart solvent resistance thereto.

BACKGROUND ART

The Patent Document 1 describes an asymmetric gas separation membrane obtained by a heat treatment of infusibilization an asymmetric membrane composed of substituted polyimide having at a temperature in a range from 270 to 450° C. and lower than the glass transition temperature of the polyimide. This gas separation membrane had a practical capability to separate and collect organic vapor because the membrane has been improved in solvent resistance and had a high permeance for methanol vapor.

However, there have been problems of embrittlement and deterioration in mechanical strength when polyimide has been infusibilized by a heat treatment at a high temperature as described above.

On the other hand, the Patent Document 2 and the Patent Document 3 describe an asymmetric hollow fiber gas separation membrane, which is formed of polyimide consisting of a particular aromatic tetracarboxylic acid component and aromatic diamine, and which has an excellent ratio of the permeance for oxygen gas to the permeance for nitrogen gas. The Patent Document 4 also describes a method for producing a polyimide asymmetric membrane consisting of multi-component polyimides.

However, the separation membranes described in these references are insufficient in solvent resistance, which need further improvement for separating and collecting organic vapor.

Patent Document 1; JP A 2004-267,810
Patent Document 2; JP A H03-267,130
Patent Document 3; JP A H06-254,367
Patent Document 4; JP A 2006-224,097

DISCLOSURE OF INVENTION

Problems to be Solved by the Invention

An objective of the present invention is to provide an improved asymmetric hollow fiber gas separation membrane having excellent mechanical strength despite it is obtained by heat treatment for infusibilization of an asymmetric hollow fiber polyimide membrane to impart solvent resistance thereto.

Means of Solving the Problems

The present invention relates to the following matters.
1. An asymmetric hollow fiber gas separation membrane, which has such a mechanical strength that a tensile elongation at break is not less than 10%, preferably not less than 15%, more preferably not less than 20% as a hollow fiber membrane, wherein the asymmetric hollow fiber gas separation membrane is obtained by subjecting an asymmetric hollow fiber polyimide membrane to a heat treatment having a maximum temperature in a range from 350 to 450° C.; the asymmetric hollow fiber polyimide membrane being formed with a polyimide essentially having a repeating unit represented by general formula (1);

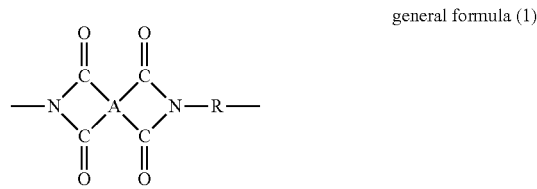

general formula (1)

wherein in the general formula (1), 20 to 80 mol % of A is a tetravalent unit based on a biphenyl structure represented by formula (2), 20 to 80 mol % of A is a tetravalent unit based on a diphenylhexafluoropropane structure represented by formula (3), and 0 to 30 mol % of A is a tetravalent unit based on a phenyl structure represented by formula (4); and in the general formula (1), 30 to 70 mol % of R is a divalent unit represented by formula (5) and/or formula (6), and 30 to 70 mol % of R is a divalent unit having one or two aromatic rings other than formula (5) or (6),

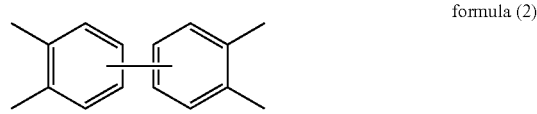

formula (2)

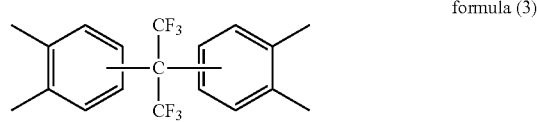

formula (3)

formula (4)

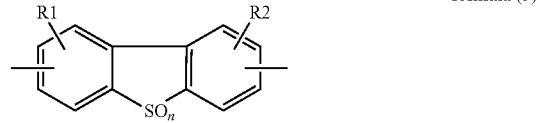

formula (5)

wherein, R1 and R2 are a hydrogen atom or an organic group, and n is 0, 1 or 2,

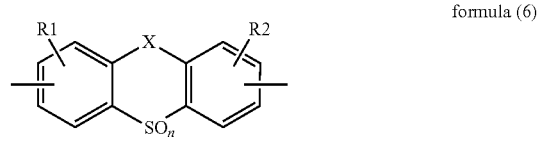

formula (6)

wherein, R1 and R2 are a hydrogen atom or an organic group, X is —CH$_2$— or —CO—, and n is 0, 1 or 2.

2. The asymmetric hollow fiber gas separation membrane according to the above item 1, wherein the divalent unit, as R in the general formula (1), having one or two aromatic rings other than formula (5) or (6) is one or more units selected from the group consisting of formulae (7) to (10):

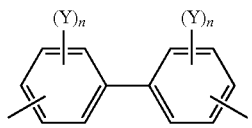

formula (7)

wherein, Y is chlorine atom or bromine atom, and n is 1 to 3,

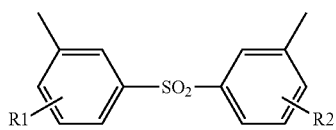

formula (8)

wherein, R1 and R2 are a hydrogen atom or an organic group,

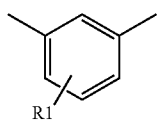

formula (9)

wherein, R1 is a hydrogen atom or an organic group,

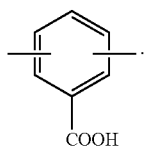

formula (9)

Herein, in formulae (5), (6), (8) and (9), R1 and R2 is, preferably, a hydrogen atom or an alkyl or alkoxy group having 1 to 5 carbon atoms.

3. The asymmetric hollow fiber gas separation membrane according to the above item 1 or 2, characterized in that the divalent unit, as R in the general formula (1), having one or two aromatic rings other than formula (5) or (6) is a divalent unit based on a biphenyl structure of formula (7):

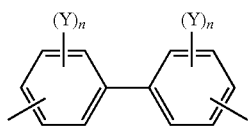

formula (7)

wherein, Y is chlorine atom or bromine atom, and n is 1 to 3.

4. The asymmetric hollow fiber gas separation membrane according to any one of the above items 1 to 3, characterized in that it has such a solvent resistance that a solvent resistance index is not less than 50%, preferably not less than 60%, more preferably not less than 70%, particularly preferably not less than 75% as a hollow fiber membrane.

5. The asymmetric hollow fiber gas separation membrane according to any one of the above items 1 to 4, wherein the asymmetric hollow fiber gas separation membrane has such a thermal stability that a thermal shrinkage ratio is not more than 3%, preferably not more than 2%, more preferably not more than 1% in a longitudinal direction of a hollow fiber membrane when treated with heat at 380° C. for 30 minutes.

6. The asymmetric hollow fiber gas separation membrane according to any one of the above items 1 to 5, wherein the asymmetric hollow fiber gas separation membrane has such a gas separation capability that a permeance for methanol vapor ($P'_{MeOH}$) at 120° C. is not less than $5 \times 10^{-5}$ cm$^3$(STP)/cm$^2$·sec·cmHg, preferably not less than $10 \times 10^{-5}$ cm$^3$(STP)/cm$^2$·sec·cmHg, and a ratio of the permeance for methanol vapor to that for dimethyl carbonate vapor ($P'_{MeOH}/P'_{DMC}$) is not less than 5, preferably not less than 8.

7. An asymmetric hollow fiber gas separation membrane, essentially consists of an asymmetric hollow fiber polyimide membrane, and having such a mechanical strength that a tensile elongation at break is not less than 10% as a hollow fiber membrane, such a solvent resistance that a solvent resistance index is not less than 50% as a hollow fiber membrane, such a thermal stability that a thermal shrinkage ratio is not more than 3% in a longitudinal direction of a hollow fiber membrane when treated with heat at 380° C. for 30 minutes, and such a gas separation capability that a permeance for methanol vapor ($P'_{MeOH}$) at 120° C. is not less than $5 \times 10^{-5}$ cm$^3$(STP)/cm$^2$·sec·cmHg, and a ratio of the permeance for methanol vapor to that for dimethyl carbonate vapor ($P'_{MeOH}/P'_{DMC}$) is not less than 5.

The term "essentially consists of an asymmetric hollow fiber polyimide membrane" means that the structure of the asymmetric hollow fiber polyimide membrane is substantially maintained. In other word, whereas the polyimide is infusibilized, the polyimide backbone before the infusibilization is maintained with no change. Namely, the asymmetric hollow fiber gas separation membrane of the present invention is composed of the polyimide backbone.

8. A method for separating gas, comprising contacting a mixed gas comprising an organic compound vapor with a supply side of the asymmetric hollow fiber gas separation membrane according to any one of the above items 1 to 7, and allowing a specified component in the mixed gas to permeate selectively toward a permeation side of said asymmetric hollow fiber gas separation membrane to separate and collect a mixed gas in which said organic compound vapor is enriched.

9. A hollow fiber gas separation membrane module, comprising:

a hollow fiber element comprising a hollow fiber bundle in which a number of the asymmetric hollow fiber gas separation membranes according to any one of the above items 1 to 7 are bundled, and a tube sheet into which at least one of end parts of said hollow fiber bundle is embedded to be fixed while retaining each hollow fiber membrane in an opened state, and a vessel comprising a mixed gas inlet, a non-permeated gas outlet and a permeated gas outlet, wherein the hollow fiber element is housed in the vessel in such a manner that a internal space of said asymmetric hollow fiber gas separation membrane is separated from an external space thereof.

10. A method for producing an asymmetric hollow fiber gas separation membrane, comprising the steps of:

(Step 1) mixing a polyimide component A and a polyimide component B to prepare a multicomponent polyimide mixed solution in a combination such that $N_A$ and $N_B$ satisfy equation 1:

$$2.35 \times N_A^{-2.09} < N_B < 450 \times N_A^{-1.12} \qquad \text{(equation 1)};$$

(Step 2) further subjecting said multicomponent polyimide mixed solution to a polymerization-imidization reaction;
(Step 3) forming an asymmetric hollow fiber polyimide membrane by a phase inversion process using said multicomponent polyimide mixed solution; and
(Step 4) then, subjecting said asymmetric hollow fiber polyimide membrane to a heat treatment having a maximum temperature in a range from 350 to 450° C.,
wherein the polyimide component A is a starting material component of a polyimide A comprising a fluorine atom in its chemical structure and/or a polymerization-imidization reaction product of said starting material component, $N_A$ is a number averaged degree of polymerization of said polyimide component A, the polyimide component B is a starting material component of a polyimide B and/or a polymerization-imidization reaction product of said starting material component, and $N_B$ is a number averaged degree of polymerization of said polyimide component B.

11. A method for producing the asymmetric hollow fiber gas separation membrane according to any one of the above items 1 to 7, comprising the steps of:

(Step 1) mixing a polyimide component A and a polyimide component B to prepare a multicomponent polyimide mixed solution in a combination such that $N_A$ and $N_B$ satisfy equation 1 described below:

$$2.35 \times N_A^{-2.09} < N_B < 450 \times N_A^{-1.12} \qquad \text{(equation 1)};$$

wherein, the multicomponent polyimide mixed solution in which said polyimide component A and a polyimide component B are mixed contains A and R in said formula (1) in a proportion as defined in the above item 1, wherein the tetravalent unit based on a diphenylhexafluoropropane structure represented by said general formula (3) is predominantly contained in said polyimide component A, i.e., generally not less than 80% thereof, preferably not less than 80% thereof, and typically entire amount thereof is contained in said polyimide component A,
(Step 2) further subjecting said multicomponent polyimide mixed solution to a polymerization-imidization reaction,
(Step 3) forming an asymmetric hollow fiber polyimide membrane by a phase inversion process using said multicomponent polyimide mixed solution, and
(Step 4) then, subjecting said asymmetric hollow fiber polyimide membrane to a heat treatment having a maximum temperature in a range from 350 to 450° C.,
wherein the polyimide component A is a starting material component of a polyimide A comprising a fluorine atom in its chemical structure and/or a polymerization-imidization reaction product of said starting material component, $N_A$ is a number averaged degree of polymerization of said polyimide component A, the polyimide component B is a starting material component of a polyimide B and/or a polymerization-imidization reaction product of said starting material component, and $N_B$ is a number averaged degree of polymerization of said polyimide component B.

Effect of the Invention

In accordance with the present invention, there is provided an improved asymmetric hollow fiber gas separation membrane, which is characterized by having excellent mechanical strength and ductility despite an asymmetric hollow fiber polyimide membrane has been heat treated and infusibilized to impart solvent resistance and thermal stability thereto. Since this asymmetric hollow fiber gas separation membrane is excellent in the capability of selective permeation of organic vapor, the membrane can be preferably used to separate and collect mixed gas in which particular organic compound vapor has been enriched, by means of bring the membrane into contact with the mixed gas comprising the organic compound vapor and allowing the organic compound to permeate selectively toward the permeation side of the membrane.

EXPLANATION FOR SYMBOLS

Figure 2:
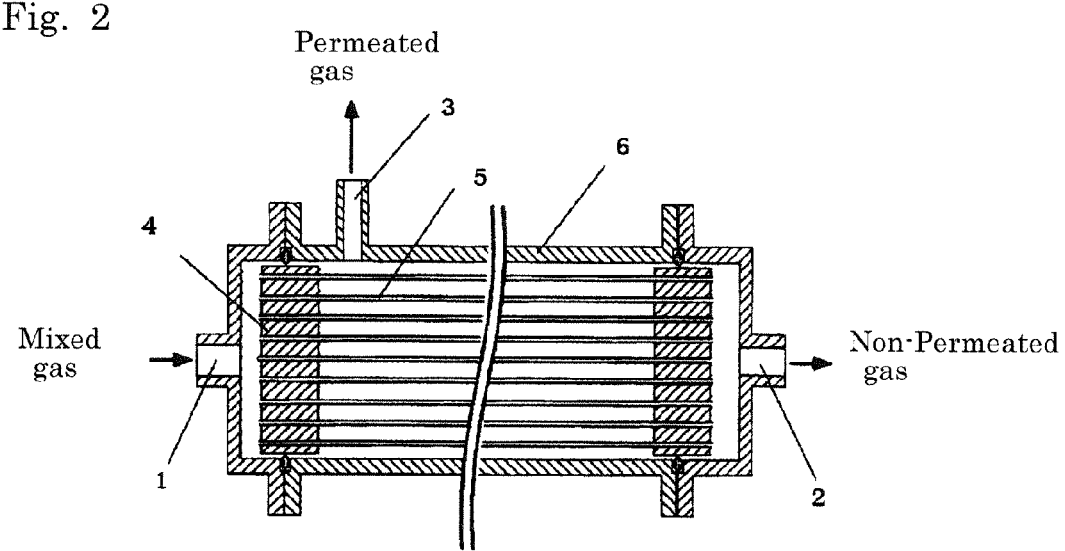
FIG. 2 is a cross-section schematically illustrating a gas separation membrane module using the asymmetric hollow-fiber gas separation membrane of the present invention.

Explanation for the Symbols of FIG. 2

1: Mixed gas inlet
2: Non-permeated gas outlet
3: Permeated gas outlet
4: Tube sheet
5: Hollow-fiber
6: Vessel Explanation for the Symbols of FIG. 3

1: Hollow-fiber membrane element
2: Flask
3: Heating apparatus for superheating mixed vapor
4: Vacuum pump 5: Cooling apparatus (trap)
6: Cooling apparatus
7: Open end of a branched pipe

BEST MODE FOR CARRYING OUT THE INVENTION

The asymmetric hollow fiber gas separation membrane of the present invention may be preferably obtained by thermally infusibilizing the asymmetric hollow fiber polyimide membrane at a temperature in a range from 350 to 450° C., wherein the asymmetric hollow fiber polyimide membrane has been prepared by a specific production method.

Usually, an asymmetric hollow fiber polyimide membrane is produced as follows; namely the polyimide solution obtained by polymerizing and imidizing almost equimolar tetracarboxylic acid component and diamine component in an organic polar solvent is used as a dope solution; the dope is extruded through a hollow fiber forming nozzle to form a hollow fiber form, which is then coagulated in a coagulation liquid to effect the phase inversion thereby an asymmetric hollow fiber membrane having a dense layer and a porous layer is formed by so-called phase inversion process; and then the coagulation liquid is removed to dry the membrane.

However, the asymmetric hollow fiber polyimide membrane to be used in the present invention cannot be obtained even if the phase inversion process is applied to, as a dope fluid, the polyimide solution obtained by randomly polymerizing and imidizing tetracarboxylic acid component and diamine component.

Figure 4:
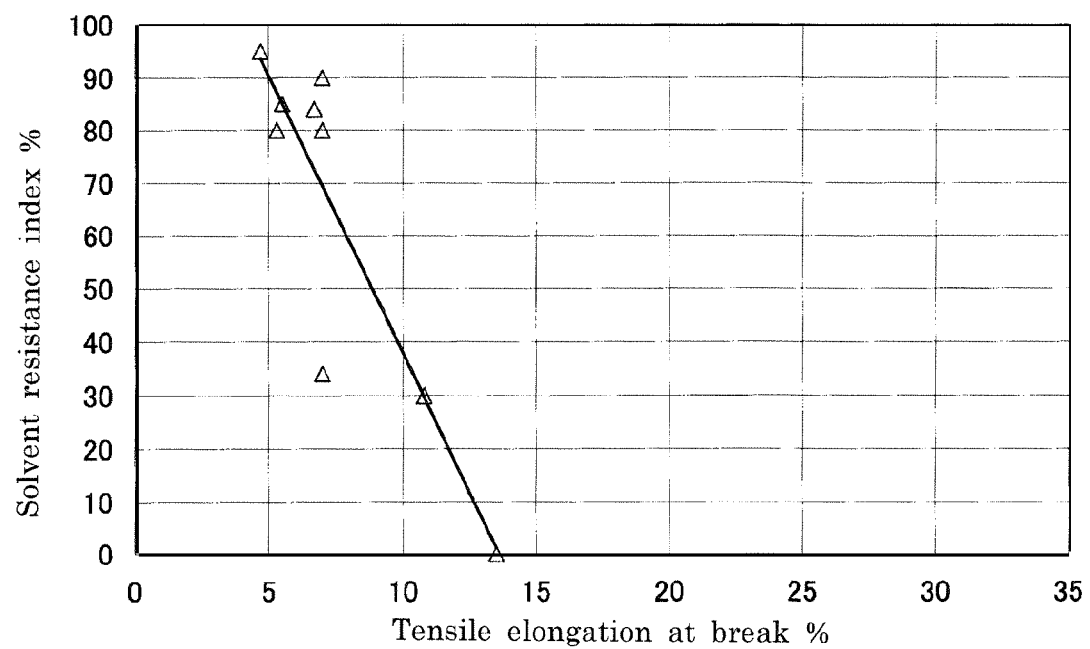
FIG. 4 is a graph to illustrate the trade-off relationship of a solvent resistance index and tensile elongation at break of the conventional asymmetric hollow fiber polyimide membrane upon the heat treatment.

If it is attempted by thermal treatment to improve solvent resistance of the asymmetric hollow fiber polyimide membrane obtained by applying the phase inversion process to, as a dope solution, the polyimide solution obtained by randomly polymerizing and imidizing tetracarboxylic acid component and diamine component, there is a trade-off relationship between solvent resistance index and tensile elongation at break as shown in FIG. 4.

The asymmetric hollow fiber polyimide membrane to be used in the present invention may be obtained by the production method described in the Patent Document 4. By simply saying, it is obtained by polymerization-imidization so that particular components of the tetracarboxylic acid component and diamine component has predetermined features of block, and specifically it may be preferably obtained by the production method comprising the following steps (1) to (3).

Namely, when the polyimide component A is starting material component of a polyimide A comprising fluorine atom(s) in its chemical structure and/or polymerization-imidization reaction product of the above starting material component, $N_A$ is a number averaged degree of polymerization of the above polyimide component A, the polyimide component B is starting material component of polyimide B and/or polymerization-imidization reaction product of the above starting material component, and $N_B$ is a number averaged degree of polymerization of the above polyimide component B, (Step 1) mixing the polyimide component A and the polyimide component B to prepare a multicomponent polyimide mixed solution in a combination where $N_A$ and $N_B$ satisfy equation 1 described below:

$$2.35 \times N_A^{-2.09} < N_B < 450 \times N_A^{-1.12} \quad \text{(equation 1)}$$

(Step 2) further subjecting the above-mentioned multicomponent polyimide mixed solution to a polymerization-imidization reaction, and then (Step 3) obtaining the asymmetric hollow fiber membrane by the phase inversion process using the above-mentioned multicomponent polyimide mixed solution.

Here, "polyimide component" consists of polyimide starting material component (unreacted tetracarboxylic acid component and unreacted diamine component) and/or polymerization-imidization reaction product of the above-mentioned starting material component. The above-mentioned polymerization-imidization reaction product means not only a polymer having a high degree of polymerization. It also includes monomers and oligomers having a low degree of polymerization that are produced in the initial stage of reaction when the polyimide starting material component is polymerized and imidized. Namely, the polymerization-imidization reaction product includes monomers (the imidization reaction product between the tetracarboxylic acid component and the diamine component in each one molecule, two molecules in total) and/or polymers (the imidization reaction product between the tetracarboxylic acid component and the diamine component in three and more molecules in total).

In the present invention, the degree of polymerization of the polymerization-imidization reaction product is given by the repeating unit number of polyimide comprised therein. The degree of polymerization of monomers is 1 and the degree of polymerization of polymers is larger than 1. On the other hand, the degree of polymerization of the polyimide starting material component is defined as 0.5 because they have no repeating units. A number averaged degree of polymerization is calculated in accordance with the degree of polymerization as defined above.

The polyimide component A consists of the starting material component of polyimide A (unreacted tetracarboxylic acid component and unreacted diamine component) and/or the polymerization-imidization reaction product of the above-mentioned starting material component. The polyimide component B consists of the starting material component of polyimide B (unreacted tetracarboxylic acid component and unreacted diamine component) and/or the polymerization-imidization reaction product of the above-mentioned starting material component.

When the polyimide component A and the polyimide component B are mixed in a state where both are unreacted tetracarboxylic acid component and unreacted diamine component (degrees of polymerization are both 0.5), and they are subjected to the polymerization-imidization reaction, polyimide is formed which has, in major proportions, a random copolymer in which both components are bonded with significant randomness. Even if the phase inversion process is applied to this polyimide, the asymmetric hollow fiber polyimide membrane to be preferably used in the present invention cannot be obtained which has the predetermined properties of block.

When the polyimide A and the polyimide B are separately subjected to the polymerization-imidization reaction, and they are mixed in a state where both are polyimides having a large degree of polymerization, it is usually difficult to prepare a homogeneous reaction solution. Although the mixed solution may be maintained in a homogeneous state for a very short time, it is not easy to maintain the homogeneous state for a long time and to stably obtain the asymmetric hollow fiber polyimide membrane by the phase inversion process. When in addition, the phase inversion process is applied to a mixed solution consisting of multiple polyimides having a large degree of polymerization, the asymmetric hollow fiber polyimide membrane cannot be obtained which may be preferably used for the present invention and has the predetermined features of block because the macro phase separation proceeds due to the repulsive interaction between both polyimides owing to differences in their chemical properties.

As the foregoing description, the asymmetric hollow fiber polyimide membrane which may be preferably used for the present invention and has the predetermined features of block may be preferably obtained by preparing the multicomponent polyimide mixed solution having the predetermined degree of polymerization and comprising the predetermined block copolymer, and applying the above-mentioned multicomponent polyimide mixed solution to the phase inversion process. If such multicomponent polyimide mixed solution is applied to the phase inversion process, a phase separation, which should be called as the micro phase separation, proceeds whereas the macro phase separation does not occur during the course of phase separation. While in this circumstance, it would appear that a phase separation structure containing distinct domains (the macro phase separation) does not occur, fine domains with approximately several nanometers to 0.1 µm in size are formed to attain the micro phase separation, whereas the boundaries of domains become less apparent as a whole, and a structure is formed which comprises a number of disordered regions without the complete phase separation of distinct polyimides. Although over the course of this phase separation, no macroscopic disarray in polyimide compositions occurs in view along the in-plane direction of membrane (a direction parallel to the membrane surface), the multicomponent polyimide layers containing a higher amount of the polyimide containing fluorine atoms forms the dense layer when viewing along the cross-sectional direction of membrane (a direction perpendicular to the membrane surface).

In this way, the dense layer and porous layer with the asymmetric structure have different chemical and physical properties each other, which allows to obtain the asymmetric hollow fiber polyimide membrane particularly with improved mechanical strength.

In the present invention, in the polyimide A containing a fluorine atom in the chemical structure thereof, at least one of the tetracarboxylic acid component and/or diamine component, as starting materials, contains a fluorine atom.

Suitable starting material for polyimide A is those producing polyimide A with high gas permeance and high gas selectivity. Particularly suitable are those producing a polyimide A having, in the form of a uniform film, a helium gas permeability coefficient ($P_{He}$) of $5 \times 10^{-10}$ cm$^3$(STP)cm/cm$^2$·sec·cmHg or greater and a helium to nitrogen gas permeation ratio ($P_{He}/P_{N2}$) of 20 or greater as measured at 80° C., preferably $P_{He}$ of $2.5 \times 10^{-9}$ cm$^3$(STP)cm/cm$^2$·sec·cmHg or greater and $P_{He}/P_{N2}$ of 20 or greater as measured at 80° C., more preferably $P_{He}$ of $3 \times 10^{-9}$ cm$^3$(STP)cm/cm$^2$·sec·cmHg or greater and $P_{He}/P_{N2}$ of 30 or greater as measured at 80° C. Containing fluorine, the polyimide A exhibits higher solubility in various solvents commonly used in a phase inversion process and having smaller surface free energy as compared with polyimide containing no fluorine.

A lower $P_{He}$ or a lower $P_{He}/P_{N2}$ than the respective recited ranges results in insufficient gas selectivity (separation ratio) and permeance of the resulting asymmetric gas separation membrane. The above-recited ranges are therefore appropriate.

Fluorine-containing tetracarboxylic acid components for making a polyimide A include, but are not limited to, 2,2-bis(3,4-dicarboxyphenyl)hexafluoropropane, 2,2'-bis(trifluoromethyl)-4,4',5,5'-biphenyltetracarboxylic acid, 4,4'-(hexafluorotrimethylene)diphthalic acid, 4,4'-(octafluorotetramethylene)diphthalic acid, and their dianhydride and esters. Particularly, preferred are 2,2-bis(3,4-dicarboxyphenyl)hexafluoropropane and its dianhydride (hereinafter maybe abbreviated as 6FDA) and esters.

Fluorine-containing diamine components for making a polyimide A include, but are not limited to, 2,2-bis(4-aminophenyl)hexafluoropropane, 2,2'-bis(trifluoromethyl)-4,4'-diaminobiphenyl, 2,2-bis[4-(4-aminophenoxy)phenyl]hexafluoropropane, and 2-trifluoromethyl-p-phenylenediamine.

These fluorine-containing starting materials may be used either individually or as a mixture of two or more of them or in combination with a fluorine-free monomer component. It is preferred that either the tetracarboxylic acid component or the diamine component contains a fluorine-containing starting material as a main component (i.e., a molar composition of 50 mol % or more, usually 55 mol % or more).

In case that a fluorine-containing tetracarboxylic acid component is a major tetracarboxylic acid component to make polyimide A, the diamine component that can be used in combination includes aromatic diamines, such as p-phenylenediamine, m-phenylenediamine (hereinafter sometimes abbreviated as MPD), 4,4'-diaminodiphenyl ether (hereinafter sometimes abbreviated as DADE), 4,4'-diaminodiphenylmethane, 3,3'-dimethyl-4,4'-diaminodiphenylmethane, 3,3',5,5'-tetramethyl-4,4'-diaminodiphenylmethane, 3,3'-dichloro-4,4'-diaminodiphenylmethane, dimethyl-3,7-diaminodibenzothiophene=5,5-dioxide (hereinafter sometimes abbreviated as TSN; TSN is usually available in the form of a mixture having 2,8-dimethyl-3,7-diaminodibenzothiophene=5,5-dioxide as a main component and containing isomers with a methyl group(s) bonded at different positions, e.g., 2,6-dimethyl-3,7-diaminodibenzothiophene=5,5-dioxide and 4,6-dimethyl-3,7-diaminodibenzothiophene=5,5-dioxide), 2,2-bis[4-(4-aminophenoxy)phenyl]propane, 3,3'-dihydroxy-4,4'-diaminodiphenyl, 3,3'-dicarboxy-4,4'-diaminodiphenyl, 3,3'-dicarboxy-4,4'-diaminodiphenylmethane, 3,3',5,5'-tetrachloro-4,4'-diaminodiphenyl (hereinafter sometimes abbreviated as TCB), diaminonaphthalene, 2,4-dimethyl-m-phenylenediamine, 3,5-diaminobenzoic acid (hereinafter sometimes abbreviated as DABA), and 3,3'-diaminodiphenylsulfone (hereinafter sometimes abbreviated as MASN). Among them, in case that 6FDA or its derivative is used as a major tetracarboxylic acid component, particularly preferred diamines to be combined with are those having an amino group at the meta-position, such as DABA, MASN, and MPD.

Tetracarboxylic acid components that can be combined with a fluorine-containing diamine component for making polyimide A include, but are not limited to, pyromellitic acid, benzophenonetetracarboxylic acid, naphthalenetetracarboxylic acid, bis(dicarboxyphenyl)ether, bis(dicarboxyphenyl)sulfone, 2,2-bis(dicarboxyphenyl)propane, 2,3,3',4'-biphenyltetracarboxylic acid, 2,2',3,3'-biphenyltetracarboxylic acid, 3,3',4,4'-biphenyltetracarboxylic acid, and their anhydride and esters. Particularly preferred of them is 3,3',4,4'-biphenyltetracarboxylic acid dianhydride (hereinafter sometimes abbreviated as s-BPDA).

Suitable starting material for a polyimide B are such that a film obtained from the resulting polyimide B has a tensile fracture strength of 100 MPa or more, preferably 150 MPa or more, and a tensile elongation at break of 10% or more, preferably 15% or more. With the tensile fracture strength less than 100 MPa or the tensile elongation at break less than 10%, an asymmetric membrane obtained using such polyimide has insufficient mechanical strength and insufficient ductility for practical use, failing to be fabricated into gas separation modules or failing to be suited to applications using high pressure gas. Therefore, the above-recited ranges are appropriate.

Since polyimide having a fluorine atom in the chemical structure thereof has relatively low mechanical strength, it is preferred for both the monomer components providing polyimide B, i.e., a tetracarboxylic acid component and a diamine component, not to contain a fluorine-containing component as a main component. It is more preferred that both the monomer components dose not contain fluorine at all.

Tetracarboxylic acid components of a polyimide B include, but are not limited to, pyromellitic acid, benzophenonetetracarboxylic acid, naphthalenetetracarboxylic acid, bis(dicarboxyphenyl)ether, bis(dicarboxyphenyl)sulfone, 2,2-bis(dicarboxyphenyl)propane, 2,3,3',4'-biphenyltetracarboxylic acid, 2,2',3,3'-biphenyltetracarboxylic acid, 3,3',4,4'-biphenyltetracarboxylic acid, and their anhydride and esters. Particularly preferred is 3,3',4,4'-biphenyltetracarboxylic acid dianhydride.

These tetracarboxylic acid components can be used either individually or as a mixture of two or more thereof or in combination with a small amount of a fluorine-containing tetracarboxylic acid component. For example, it is acceptable that one mole of s-BPDA is combined with not more than 0.3 moles of 6FDA.

Suitable diamine components of a polyimide B include those listed above as diamine components that can be combined with 6FDA as a major tetracarboxylic acid component of polyimide A.

In step 1 of the process of the invention, a multicomponent polyimide mixed solution is prepared by mixing (i) a polyimide component A having a number averaged degree of polymerization $N_A$ and comprising starting material of a polyimide A containing a fluorine atom in the chemical structure thereof and/or a polymerization-imidization reaction product of the starting material and (ii) a polyimide component B having a number averaged degree of polymerization $N_B$ and comprising starting material of a polyimide B and/or a polymerization-imidization reaction product of the starting material, wherein the $N_A$ and $N_B$ satisfy equation 1. In FIG. 4, the range of the $N_A/N_B$ combination that satisfies equation 1 is graphically shown as a shaded region. Since the degree of polymerization of the polyimide starting material (i.e., unreacted tetracarboxylic acid component(s) and unreacted diamine component(s)) is defined to be 0.5, $N_A$ and $N_B$ are at least 0.5.

In step 2, the multicomponent polyimide mixed solution is subjected to further polymerization-imidization reaction to give a mixture containing the polyimide component A and the polyimide component B both having been further polymerized and imidized. Resultingly obtained is a multicomponent polyimide mixed solution, besides containing at least a polymer from the polyimide component A and a polymer from the polyimide component B, also containing a di- or multi-block copolymer having the polyimide component A and the polyimide component B bonded to each other at their ends and having an appropriate degree of polymerization.

The term "diblock copolymer" denotes a copolymer consisting of one block composed of a polyimide component A and one block composed of a polyimide component B joined end-to-end. The term "multi-block copolymer" denotes a copolymer in which at least one block of the two kinds of the above-mentioned blocks are bonded to the end(s) of the diblock copolymer. The di- or multi-block copolymer may contain portion(s) where blocks of a polyimide component A are bonded sequentially or portion(s) where blocks of a polyimide component B are bonded sequentially.

There will be explained in details by referring to FIG. 1.

Figure 1:
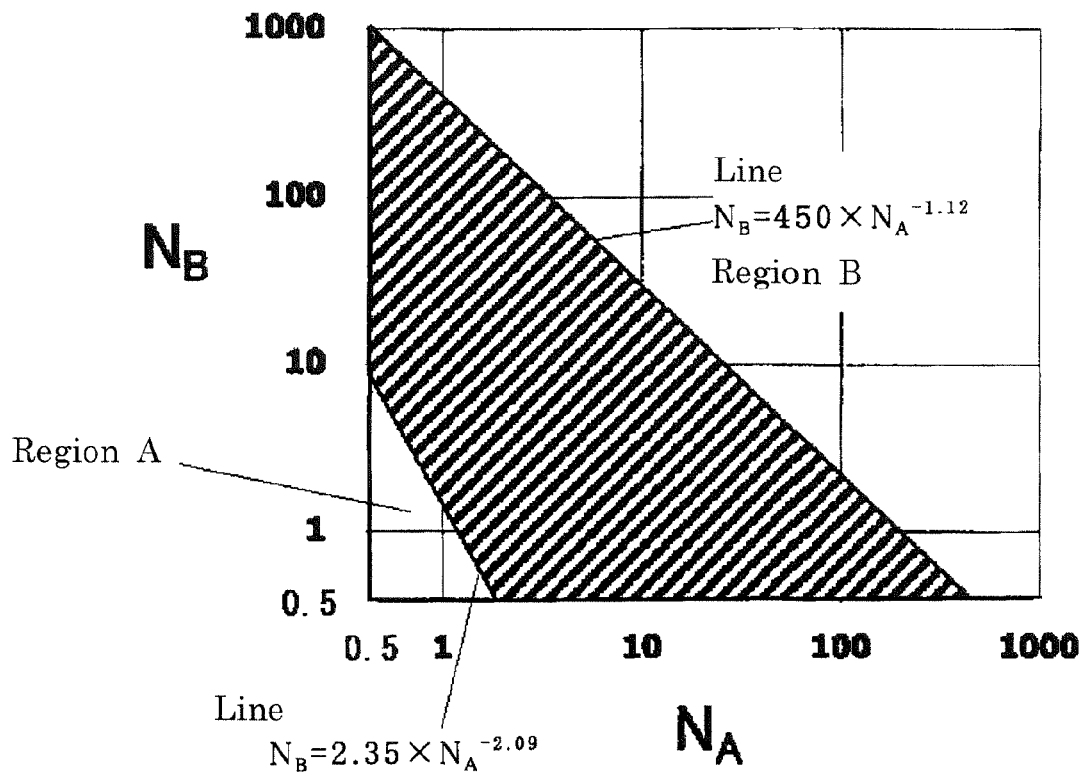
FIG. 1 is a graph to illustrate the range of combination of $N_A$ and $N_B$.

If polyimide components A and B whose $N_A$ and $N_B$ are in region A in the graph of FIG. 1 are mixed in step 1, and the resulting multicomponent polyimide mixed solution is polymerized and imidized in step 2, neither blocks consisting solely of the polyimide component A nor blocks consisting solely of the polyimide component B are formed, resulting a copolymer having the polyimide components A and B distributed with high randomness.

If polyimide components A and B whose $N_A$ and $N_B$ are in region B in the graph of FIG. 4 are mixed in step 1, and the resulting multicomponent polyimide mixed solution is polymerized and imidized in step 2, a multicomponent polyimide mixed solution containing a block copolymer could be obtained. However, since the degree of polymerization of the block copolymer is too high, strong repulsive interactions between the polyimide blocks easily result in macro phase separation. Therefore, $N_A$ and $N_B$ acombinations in regions A and B in FIG. 1 fail to provide the asymmetric membrane of the present invention.

Within the $N_A$ and $N_B$ combination range satisfying equation 1 (the shaded region in the graph of FIG. 4), there is obtained a multicomponent polyimide mixed solution containing at least a polymer from the polyimide A component, a polymer from the polyimide B component and, in addition, a di- or multi-block copolymer having the one block composed of polyimide component A and the one block composed of polyimide component B bonded each other at ends, as a whole, having an appropriate degree of polymerization. It is possible with the resulting multicomponent polyimide to achieve controlled phase separation, which may be called as microphase-separation, while inhibiting macrophase-separation that might be caused by repulsive interactions.

Step 1 is the step in which a multicomponent polyimide mixed solution is prepared by mixing (i) a polyimide component A having a number averaged degree of polymerization $N_A$ and comprising starting material of a polyimide A containing a fluorine atom in the chemical structure thereof and/or a polymerization-imidization reaction product of the starting material and (ii) a polyimide component B having a number averaged degree of polymerization $N_B$ and comprising starting material of a polyimide B and/or a polymerization-imidization reaction product of the starting material, wherein the $N_A$ and $N_B$ satisfy equation 1. The method of effecting step 1 is not particularly limited as long as a multicomponent polyimide mixed solution is obtained. For example, starting material of a polyimide A and starting material of a polyimide B are separately prepared, if necessary by polymerization-imidization reaction. They are uniformly mixed to obtain a multicomponent polyimide mixed solution. When either one of the polyimide components is a mixture of starting material (i.e., an unreacted tetracarboxylic acid component and an unreacted diamine component), the starting material of the other polyimide component can be polymerized and imidized to prepare a polyimide solution having a prescribed number averaged degree of polymerization. To the polyimide solution are added the unreacted tetracarboxylic acid component and the unreacted diamine component as the first mentioned polyimide component to give a multicomponent polyimide mixed solution. Considering that a polyimide B having a higher degree of polymerization is more advantageous to improve the mechanical strength of an asymmetric membrane, it is advantageous that the starting material of a polyimide B are polymerized and imidized in a polar solvent to prepare a polyimide B with an appropriate degree of polymerization, into which the starting material of a polyimide A are mixed to prepare a multicomponent polyimide mixed solution in step 1.

Polymerization-imidization reaction for obtaining polyimide is described below. Polymerization-imidization reaction is carried out conveniently by allowing a tetracarboxylic acid component and a diamine component to react at a predetermined ratio in a polar solvent at 120° C. or higher, preferably 160° C. or higher, and not higher than the boiling point of the solvent, whereby polyamic acid is formed, followed by dehydration and ring closure to form an imide group. In order to achieve a prescribed degree of polymerization, the reaction temperature may be lowered than the recited range. Because a residual amide acid group can undergo exchange reaction to impair the blockness of polyimide, the polymerization-imidization reaction is preferably carried out to achieve an imide conversion ratio of at least 40%, more preferably until imidization essentially completes.

The polymerization-imidization reaction between a tetracarboxylic acid component and a diamine component at a ratio close to 1 results in synthesis of polyimide with a relatively high molecular weight (a high number averaged degree of polymerization). Hence, when a polyimide having a relatively high molecular weight from the beginning is desired, it is preferred to react a tetracarboxylic acid component and a diamine component at a molar ratio of 1:0.95 to 0.995 or 1:1.005 to 1.05, more preferably 1:0.98 to 0.995 or 1:1.005 to 1.02, to obtain a polyimide component having a relatively high molecular weight.

In the case of, for example, 6FDA as a tetracarboxylic acid component and TSN as a diamine component, dehydration and ring closure reaction using 1.02 moles of TSN per mole of 6FDA at 190° C. for 30 hours results in synthesis of a polyimide having a number averaged molecular weight of about 15000 to 25000 (corresponding to a number averaged degree of polymerization of about 20 to 40); and dehydration and ring closure reaction using 1.005 moles of TSN per mole of 6FDA at 190° C. for 30 hours results in synthesis of a polyimide having a number averaged molecular weight of about 30000 to 40000 (corresponding to a number averaged degree of polymerization of about 40 to 60).

In another example, where 6FDA and DABA are used as a tetracarboxylic acid component and a diamine component, respectively, dehydration and ring closure reaction using 1.02 moles of DABA per mole of 6FDA at 190° C. for 30 hours results in synthesis of a polyimide having a number averaged molecular weight of about 15000 to 25000 (corresponding to a number averaged degree of polymerization of about 25 to 45); and dehydration and ring closure reaction using 1.005 moles of DABA per mole of 6FDA at 190° C. for 30 hours results in synthesis of polyimide having a number averaged molecular weight of about 40000 to 50000 (corresponding to a number averaged degree of polymerization of about 70 to 90).

On the other hand, reaction between 1 mol of a tetracarboxylic acid component and 0.98 mol or less or 1.02 mol or more of a diamine component results in formation of a polyimide component tailored to have a relatively low molecular weight (a small number averaged degree of polymerization).

The multicomponent polyimide mixed solution obtained in step 1 preferably has a total diamine component to total tetracarboxylic acid component molar ratio {i.e., (total number of moles of a diamine component(s))/(total number of moles of a tetracarboxylic acid component(s))} ranging from 0.95 to 0.99 or from 1.01 to 1.05, more preferably from 0.96 to 0.99 or from 1.015 to 1.04. The recited total diamine component to total tetracarboxylic acid component molar ratio is advantageous for obtaining a multicomponent polyimide mixed solution with an appropriate number averaged molecular weight or solution viscosity in step 2.

Step 2 is the step of subjecting the multicomponent polyimide mixed solution obtained in step 1, which contains the polyimide A component and polyimide B component whose $N_A$ and $N_B$ satisfy equation 1, to further polymerization-imidization reaction to prepare a mixed solution of a multicomponent polyimide containing at least a polymer from the polyimide A component, a polymer from the polyimide B component and, in addition, a di- or multi-block copolymer having the one block composed of polyimide component A and the one block composed of polyimide component B bonded each other at terminals and, as a whole, having an appropriate degree of polymerization.

Step 2 is characterized by subjecting the multicomponent polyimide mixed solution obtained in step 1 to further polymerization-imidization reaction. The above-described method for polymerization-imidization can be adopted as appropriate.

A polar solvent capable of uniformly dissolving multicomponent polyimide is used in the multicomponent polyimide mixed solutions prepared in steps 1 and 2. The expression "uniformly dissolving" as used herein means that the solvent is capable of providing a solution free from macrophase-separated domains large enough to scatter visible light and free from apparently obvious turbidity. The solution may contain microphase-separated domains of sizes not so large as to cause visible light scattering. The solution is not indispensably required to be uniform on the molecular chain level.

If a solvent used is such that the multicomponent polyimide solution develops apparently obvious turbidity after the preparation, a gas separation membrane having high gas treating performance as aimed in the invention cannot be obtained.

Suitable polar solvents include, but are not limited to, phenol-based solvents, such as phenols, e.g., phenol, cresol, and xylenol, catechols having two hydroxyl groups on a benzene ring, and halogenated phenols, e.g., 3-chlorophenol, 4-chlorophenol (hereinafter sometimes abbreviated as PCP), 4-bromophenol, and 2-chloro-5-hydroxytoluene; amide solvents, such as N-methyl-2-pyrrolidone, N,N-dimethylformamide, N,N-dimethylacetamide, and N,N-diethylacetamide; and mixtures thereof.

The method of the polymerization-imidization reaction in step 2 is not particularly restricted as long as the reaction results in formation of a di- or multi-block copolymer containing polyimide component A and polyimide component B bonded each other at block terminals. Usually, formation of the di- or multi-block copolymer can conveniently be accomplished by conducting polymerization-imidization until the multicomponent polyimide mixed solution increases its number averaged molecular weight preferably twice or more, more preferably five times or more. The multicomponent polyimide mixed solution resulting from the polymerization-imidization reaction of step 2 suitably has a number averaged degree of polymerization of 20 to 1000, preferably 20 to 500, more preferably 30 to 200. A mixed solution with too small a number averaged degree of polymerization has too low a solution viscosity, which makes membrane formation in step 3 difficult, and the resulting asymmetric membrane reduces mechanical strength. A mixed solution with too large a number averaged degree of polymerization is liable to macrophase separation and has too high a solution viscosity, which also makes membrane formation in step 3 difficult. The solution viscosity (rotational viscosity) of the multicomponent polyimide mixed solution obtained in step 2 is a characteristic requirement for shaping the solution into a prescribed form (e.g., a hollow fiber form) and for stabilizing the form as shaped, in the formation of an asymmetric membrane by phase inversion. In the present invention, it is advisable to adjust the solution viscosity of the multicomponent polyimide mixed solution in a range of 20 to 17000 poise, preferably 100 to 15000 poise, more preferably 200 to 10000 poise, at 100° C. A polyimide solution having a solution viscosity falling within the recited range can be, for example, spun through a spinneret into a desired shape such as a hollow fiber in a stable manner in a spinning procedure in the manufacture of hollow fiber asymmetric membrane. With a solution viscosity lower than 20 poise or higher than 17000 poise, the solution has difficulty in stabilizing the shape as extruded, such as a hollow fiber geometry.

A multicomponent polyimide mixed solution having an appropriate number averaged degree of polymerization and solution viscosity can easily be obtained by (1) preparing a multicomponent polyimide mixed solution having a total diamine component to total tetracarboxylic acid component molar ratio {i.e., (total number of moles of a diamine component(s))/(total number of moles of a tetracarboxylic acid component(s))} ranging from 0.95 to 0.99 or from 1.01 to 1.05, more preferably from 0.96 to 0.99 or from 1.015 to 1.04 in step 1 and (2) further polymerizing and imidizing the resulting mixed solution in step 2.

It is preferred that the amount of the solvent in the multicomponent polyimide mixed solutions of steps 1 and 2 be adjusted to give a polymer concentration of 5% to 40% by weight, preferably 8% to 25% by weight, more preferably 9% to 20% by weight. At a polymer concentration lower than 5% by weight, the solution is liable to produce an asymmetric membrane with defects in a phase inversion process, which, when used as a gas separation membrane, has poor gas permeation performance. At a polymer concentration exceeding 40% by weight, the resulting asymmetric membrane tends to have a reduced rate of gas permeation due to an increased thickness in its dense layer or a reduced porosity in its porous layer. Therefore, it is difficult to obtain an asymmetric hollow fiber polyimide membrane satisfactory used in the present invention.

Step 3 is characterized in that an asymmetric membrane is formed by phase inversion of the multicomponent polyimide mixed solution obtained in step 2. A phase inversion process is a known membrane formation technique in which a polymer solution is brought into contact with a coagulation bath to cause phase inversion. In the present invention, so-called dry/wet process is conveniently employed. The dry/wet process, which was proposed by Loeb, et al. (see, e.g., U.S. Pat. No. 3,133,132), involves evaporating the solvent from the polymer solution in a form of film to form a thin dense layer, then immersing the film into a coagulating bath (a solvent miscible with the solvent of the polymer solution and incapable of dissolving the polymer) to form fine pores by using phase separation phenomenon occurring here so as to form a porous layer. In step 3 according to the present invention, macrophase-separation is suppressed, and microphase separation is allowed to proceed to form a asymmetric hollow fiber polyimide membrane having a properly controlled composition of the fluorine-containing polyimide in its dense layer.

The asymmetric hollow fiber polyimide membrane preferably used in the present invention can be conveniently produced by adopting a dry/wet spinning process for carrying out step 3. In the dry/wet spinning process, the above-mentioned dry/wet phase inversion process is applied to a polymer solution having been extruded through a spinneret into a hollow fiber geometry to manufacture an asymmetric hollow fiber membrane. More specifically, a polymer solution is forced through a spinneret into a hollow fiber geometry. Immediately thereafter, the extruded hollow fibers are passed through an air or nitrogen gas atmosphere and then immersed in a coagulation bath essentially incapable of dissolving the polymer components and compatible with the solvent of the polymer mixed solution to form an asymmetric structure. Subsequently, the hollow fibers are dried and, if necessary, heat treated to make a separation membrane.

In order to stably maintain the shape (e.g., hollow fiber) immediately after the extrusion, the multicomponent polyimide mixed solution to be extruded through the spinneret preferably has a solution viscosity of 20 to 17000 poise, more preferably 100 to 15000 poise, even more preferably 200 to 10000 poise, at the spinning temperature (e.g., 100° C.) as previously stated. Coagulation is preferably carried out by immersing in a first coagulation bath where the membrane is coagulated to an extent enough to retain its shape (e.g., hollow fiber), taking up the membrane by a guide roll, and immersing in a second coagulating bath where the membrane is thoroughly coagulated. Drying of the coagulated membrane is efficiently conducted by replacing the coagulation solvent with a solvent such as a hydrocarbon prior to drying. The heat treatment may be performed preferably at a temperature lower than the softening temperature or the secondary transition temperature of every polymer constituting the multicomponent polyimide.

The multicomponent polyimide mixed solution used in step 3 of the invention is a mixed solution of a multicomponent polyimide obtained by the polymerization-imidization reaction in step 2 and having an appropriate degree of polymerization and containing at least a polymer from the polyimide A component, a polymer from the polyimide B component and, in addition, a di- or multi-block copolymer having the polyimide component A and the polyimide component B bonded each other at block terminals.

While the mixed solution undergoes phase separation in the membrane formation step according to the phase inversion process, the di- or multi-block copolymer having the polyimide component A and the polyimide component B bonded each other at chain-ends functions as a kind of a surfactant between the polymer of the polyimide component A and the polymer of the polyimide component B, which are incompatible to each other. In another expression, the di- or multi-block copolymer is distributed in the interface between the domains of the polyimide component A and the domains of the polyimide component B to block the repulsive interactions between the different domains. In this way, the di- or multi-block copolymer allows desirable microphase-separation to proceed while suppressing macrophase-separation.

Fluorine-containing polyimide is considered to hardly precipitate in the dense layer in the asymmetric membrane formation by phase inversion because it is generally more soluble than fluorine-free polyimide. Nonetheless, because fluorine-containing polyimide has a low surface free energy, it is thermodynamically segregated to the membrane surface so as to reduce the enthalpy of the membrane surface. For this reason, the phase inversion step of step 3 is controlled so that fluorine-containing polyimide exists in the dense layer in a higher proportion.

The asymmetric hollow fiber polyimide membrane thus-obtained has a dense layer and a porous layer. The dense layer has such denseness as to have essentially different permeances depending on gas species (for example, the helium to nitrogen gas permeance ratio is 1.2 or more at 50° C.) and therefore functions to separate gas species. On the other hand, the porous layer has such porosity as to have practically no gas separation functionality. The pore size is not necessarily uniform. The porous layer may have the pore size decreasing from its surface to the inside and may continuously lead to a dense layer. Preferably, the dense layer has no defects and exhibits high gas separation performance. The form, thickness, dimension, etc. are not limited. In the asymmetric hollow fiber polyimide membrane preferably used in the present invention, a thickness of the dense layer is about 1 to 1000 nm, preferably about 20 to 200 nm, and that of the porous layer is about 10 to 2000 μm, preferably about 10 to 500 μm; an inner diameter is about 10 to 3000 μm, preferably about 20 to 900 μm, and an outer diameter is about 30 to 7000 μm, preferably about 50 to 1200 μm, wherein the dense layer is present in the outer side.

The asymmetric hollow fiber gas separation membrane of the present invention can be preferably obtained by infusibilizing, through the heat treatment having a maximum temperature of 350 to 450° C., preferably 360 to 450° C., and more preferably 360 to 430° C., the asymmetric hollow fiber polyimide membrane obtained by the production method explained above. Herein, the maximum temperature should be a temperature lower than the glass-transition temperature of the asymmetric hollow fiber polyimide membrane. If it is higher than the glass-transition temperature, the asymmetric structure cannot be maintained. Although the heat treatment may be conducted in an inert atmosphere, it is preferably conducted in atmosphere containing oxygen, particularly in the air because the infusibilization can be effectively carried out. Although the heat treating time is not particularly limited, 0.01 to 10 hours, preferably approximately 0.1 to 2 hours is preferable in the temperature range of the above-mentioned maximum temperature in view of the heat treatment efficiency. By this heat treatment, the asymmetric hollow fiber polyimide membrane can be infusibilized to preferably give the asymmetric hollow fiber gas separation membrane of the present invention. The infusibilization as used herein means that the membrane becomes difficult to be dissolved in polar solvents that dissolve the multicomponent polyimide when the asymmetric hollow fiber polyimide membrane is formed, in particular para-chlorophenol. In the present invention, the solvent resistance index is preferably not less than 50%, more preferably not less than 70%, still preferably not less than 80%, and particularly preferably not less than 90% when the extent of infusibilization is expressed by the solvent resistance index (%) (see Examples). When the maximum temperature is lower than 350° C., the infusibilization becomes insufficient. On the other hand, it is not preferable that the maximum temperature exceeds 450° C. due to initiation of the thermal decomposition in the polyimide's main chain (polyimide backbone). Meanwhile, it is not preferable for the maximum temperature to exceed the glass-transition temperature of the asymmetric hollow fiber polyimide membrane because the asymmetric structure cannot be maintained.

While a solvent resistance index is improved with progression of the infusibilization explained above, the mechanical properties of polyimide changes in quality. Specifically, polyimide increasingly loses its ductibility, and consequently the tensile elongation at break of the polyimide membrane decreases. Generally, the loss of ductibility in polyimide causes a change in morphology of the fracture section when the asymmetric hollow fiber polyimide membrane is destroyed with tension.

Figure 6:
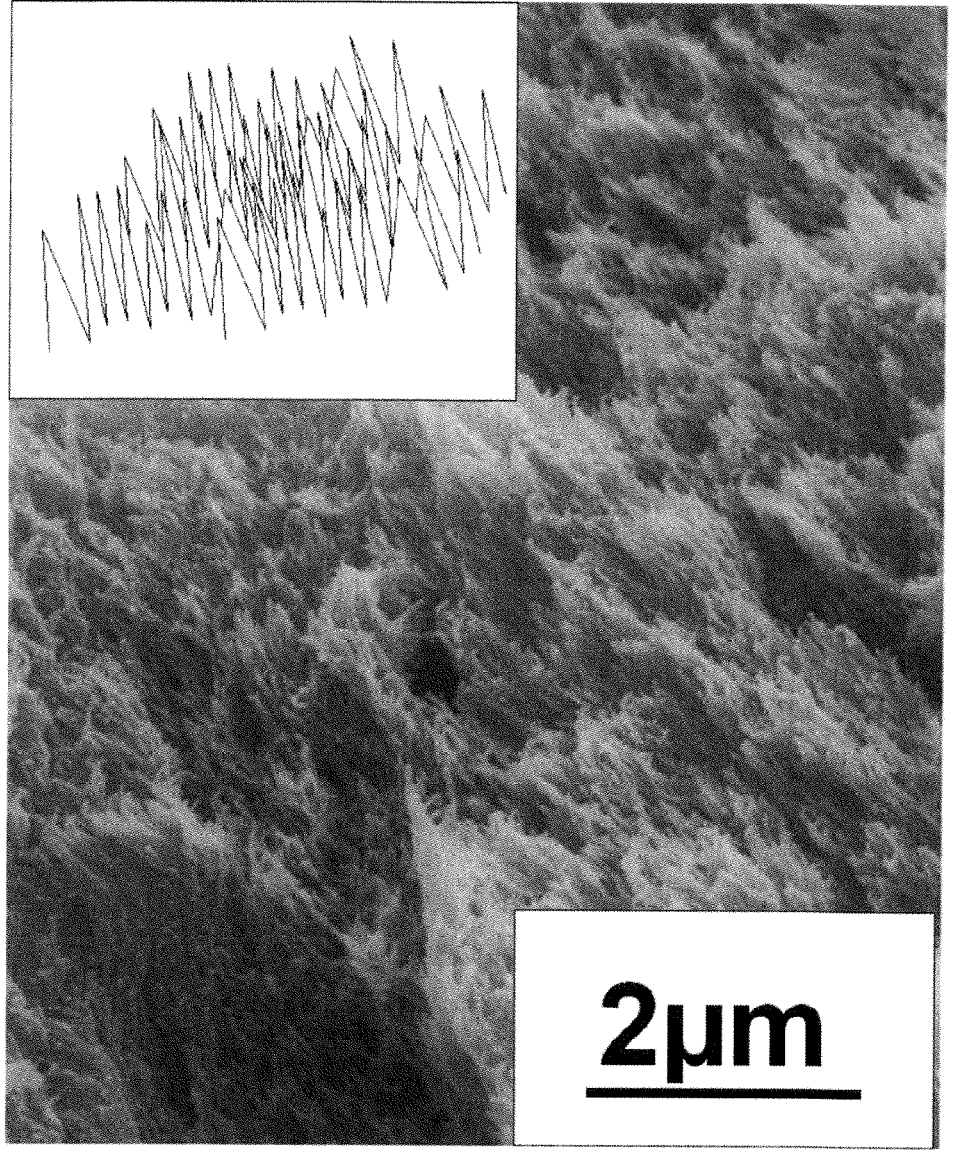
FIG. 6 is the scanning electron microscopy image of the tensile fracture section of the asymmetric hollow fiber gas separation membrane obtained in the comparative example 3. In order to visualize the morphology of the fracture surface clearly, the micrograph represents the fracture surface tilted to 45° toward the upper direction of plane of paper (same to FIGS. 7 and 8). An enlarged sketch of the figuration of the fracture section is shown in the upper-left part of the micrograph.

As shown in FIG. 6, when the asymmetric hollow fiber polyimide membrane subjected to a heat treatment in a range where the maximum temperature is lower than 350° C. is destroyed with tension, the morphology on the fracture section is observed in which polyimide has been elongated in a fibrous form in a vertical direction from a fracture cross section and destroyed. Although FIG. 6 shows the example of the heat treatment on the asymmetric hollow fiber polyimide membrane not by the preferable production method mentioned above (Comparative Example 3), a similar figuration is also observed for the heat treatment at a temperature not higher than 350° C. on the asymmetric hollow fiber polyimide membrane obtained by the preferable production method mentioned above.

Figure 7:
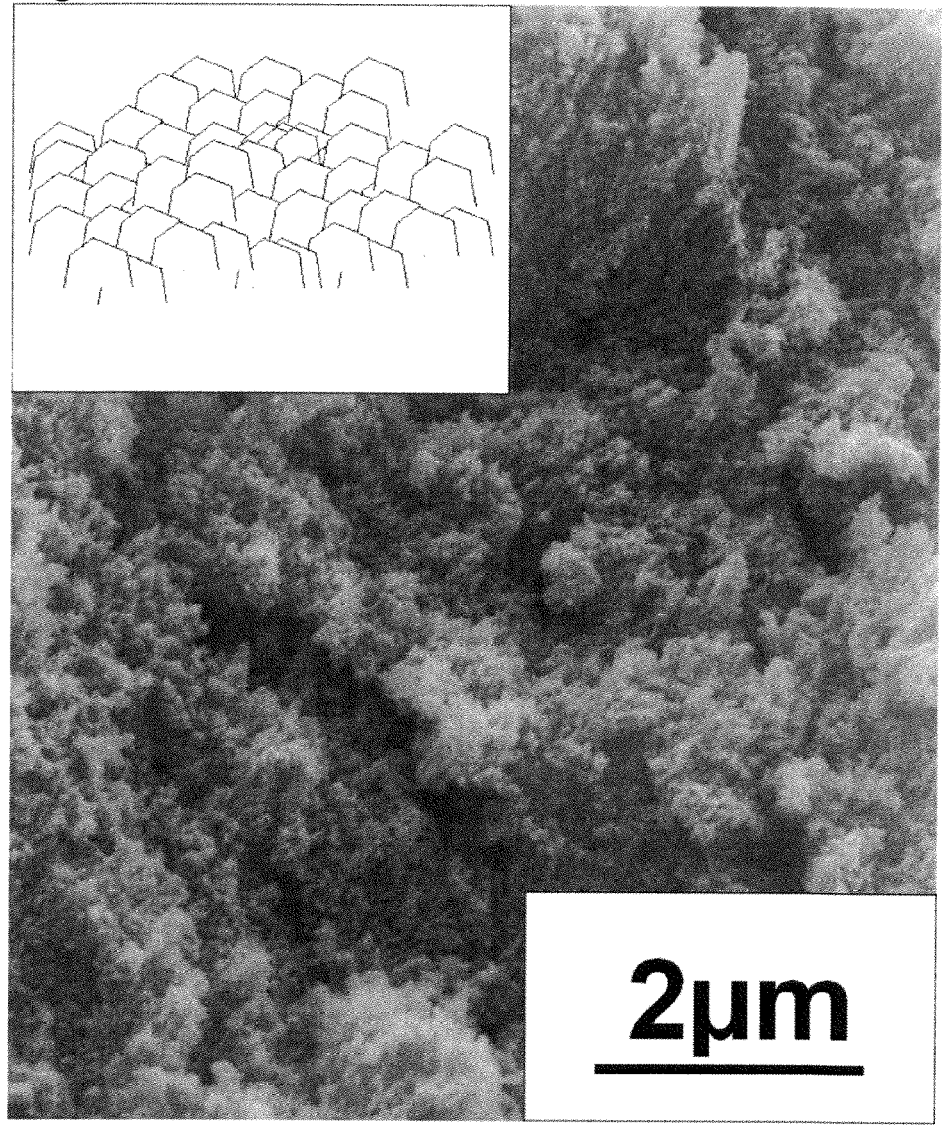
FIG. 7 is the scanning electron microscopic image of the tensile fracture surface of the asymmetric hollow fiber gas separation membrane obtained in the comparative example 2. An enlarged sketch of the morphology of the fracture surface is shown in the upper-left part of the micrograph.

Next, destroyed areas exhibiting the fracture surface with a rugged granular figuration are observed as shown in FIG. 7 when the asymmetric hollow fiber polyimide membrane (Comparative Example 2) in which the asymmetric hollow fiber polyimide membrane not by the preferable production method mentioned above is subjected to a heat treatment in a range where the maximum temperature is not lower than 350° C. is destroyed with tension.

Figure 8:
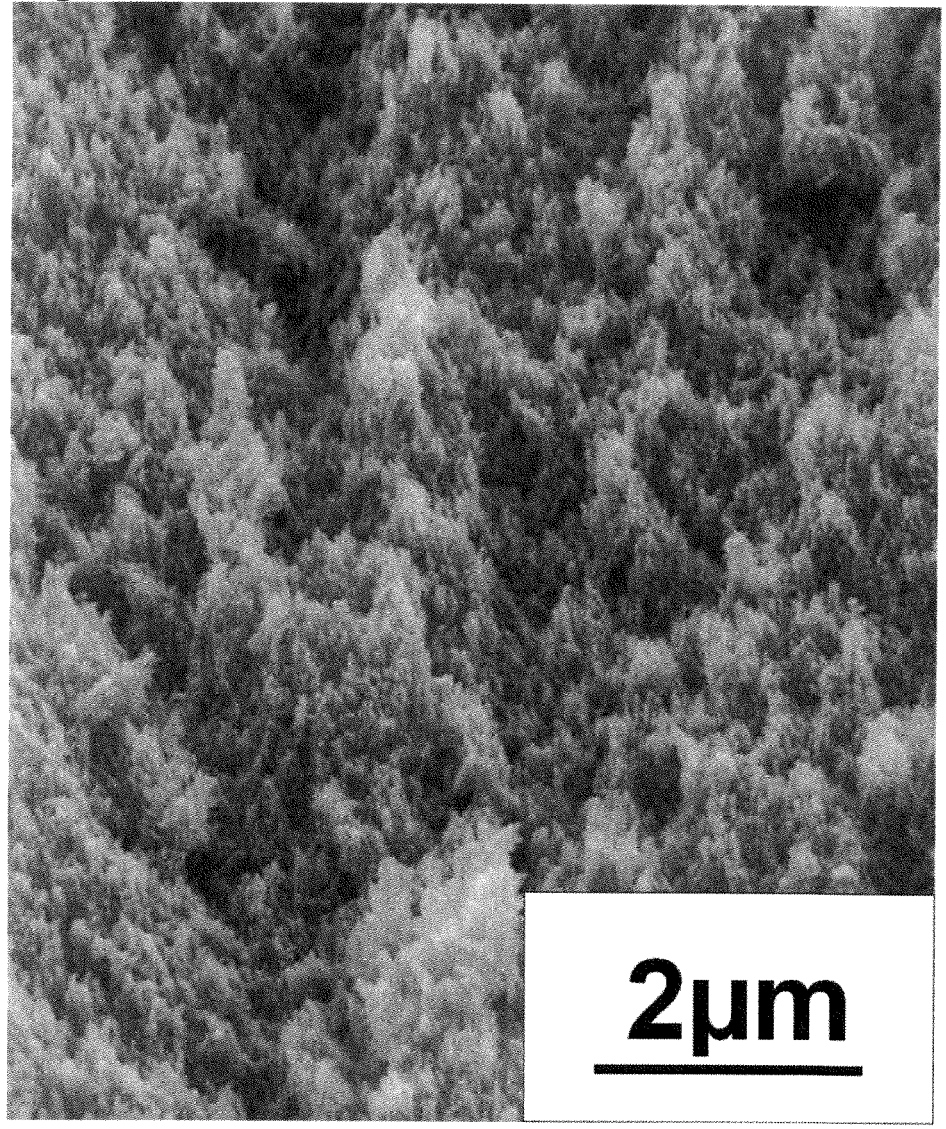
FIG. 8 is the scanning electron microscopic image of the tensile fracture section of the asymmetric hollow fiber gas separation membrane obtained in the working example 1.

On the other hand, the figuration elongated in a fibrous form is observed as shown in FIG. 8 though it is not so much distinct as FIG. 6 when the asymmetric hollow fiber polyimide membrane (Example 1) in which the asymmetric hollow fiber polyimide membrane obtained by the preferable production method mentioned above is subjected to the heat treatment having the maximum temperature of 350 to 450° C. is destroyed with tension. If it exceeds 450° C., the fracture section is almost covered by the areas exhibiting the rugged granular figuration as FIG. 7.

In this way, it can also be said that the asymmetric hollow fiber gas separation membrane of the present invention has excellent mechanical properties in the heat treatment within a range where the fibrous figuration in the figuration of the fracture section is gradually converted up to the granular figuration. This is presumably because the presence of microphase-separated structure obstructs the propagation of cracks with tension.

The asymmetric hollow fiber gas separation membrane of the present invention is obtained by the infusibilization through heat treatment having the maximum temperature of 350 to 450° C., and this heat treatment improves the permeation and separation properties of organic vapor mixtures. In addition, the solvent resistance is remarkably improved due to the infusibilization by heat treatment whereas it has excellent mechanical properties such as tensile elongation at break in spite of the infusibilization by heat treatment.

Next more specifically, the asymmetric hollow fiber gas separation membrane of the present invention is explained on the basis of particularly preferable embodiments of the present invention.

The asymmetric hollow fiber gas separation membrane of the present invention is particularly preferably obtained by heat treatment within a temperature range where the maximum temperature is 350 to 450° C. on the asymmetric hollow fiber polyimide membrane produced by applying the multicomponent polyimide solution to the phase inversion process as a dope solution; the multicomponent polyimide solution having been obtained by the polymerization and imidization so as to have the predetermined properties of block by the above-mentioned method of production, and formed with the polyimide having essentially the repeating unit consisting of the general formula (1) described below.

The asymmetric hollow fiber polyimide membrane formed with this polyimide has preferable gas separation properties and mechanical properties. Since in addition, this polyimide has a high glass transition temperature, it can preferably maintain the asymmetric structure even if a thermal treatment in a temperature range from 350 to 450° C. is conducted.

Meanwhile, an asymmetric hollow fiber gas separation membrane having very poor mechanical strength with a tensile elongation at break less than 10% can be merely obtained even by subjecting an asymmetric hollow fiber polyimide membrane to a heat treatment having a maximum temperature of from 350 to 450° C., which is produced by applying the polyimide solution obtained by polymerization and imidization through the conventional method of randomly polymerizing to the phase inversion process as a dope solution, and which is formed with a polyimide essentially having a repeating unit represented below by a general formula (1).

general formula (1)

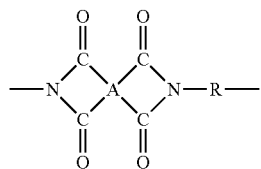

wherein in the general formula (1), 20 to 80 mol % of A is a tetravalent unit based on a biphenyl structure represented by formula (2):

formula (2)

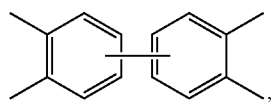

20 to 80 mol % of A is a tetravalent unit based on a diphenylhexafluoropropane structure represented by formula (3):

formula (3)

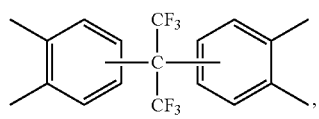

0 to 30 mol % of A is a tetravalent unit based on a phenyl structure represented by formula (4):

formula (4)

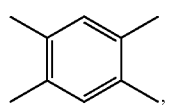

and in the general formula (1), 30 to 70 mol % of R is a divalent unit represented by formula (5) and/or formula (6):

formula (5)

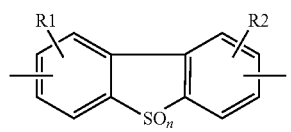

wherein, R1 and R2 are a hydrogen atom or an organic group, and n is 0, 1 or 2, formula (6)

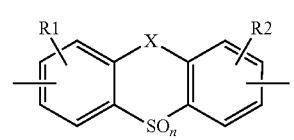

wherein, R1 and R2 are a hydrogen atom or an organic group, X is —CH$_2$— or —CO—, and n is 0, 1 or 2, and 30 to 70 mol % of R is a divalent unit having one or two aromatic rings other than formula (5) or (6).

The divalent unit having one or two aromatic rings other than formula (5) or (6) and composing 30 to 70 mol % of R in the general formula (1) is preferably one or more units selected from the group consisting of the formulae (7) to (10) described below, more preferably the formulae (7) described below:

formula (7)

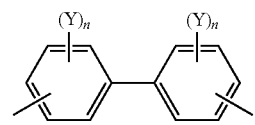

wherein, Y is chlorine atom or bromine atom, and n is 1 to 3, formula (8)

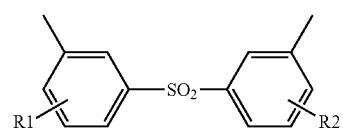

wherein, R1 and R2 are a hydrogen atom or an organic group, formula (9)

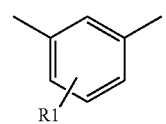

wherein, R1 is a hydrogen atom or an organic group, formula (10)

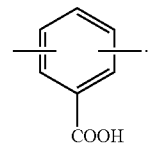

In the general formulae (5), (6), (8) and (9), R1 and R2 are preferably hydrogen atom, or alkyl group or alkoxy group having 1 to 5 carbon atoms.

In spite of infusibilization by heat treatment, this asymmetric hollow fiber gas separation membrane has a preferable mechanical strength with a tensile elongation at break not less than 10%, preferably not less than 15%, and more preferably not less than 20%. This asymmetric hollow fiber gas separation membrane is also excellent in solvent resistance due to infusibilization, and preferably, its solvent resistance index is not less than 50%, preferably not less than 60%, more preferably not less than 70%, and particularly preferably not less than 75%, and its capability of permeation for organic vapor is remarkably improved and it preferably has such a gas separation capability that a permeance for methanol vapor ($P'_{MeOH}$) at 120° C. is not less than $5\times10^{-5}$ cm$^3$(STP)/cm$^2$·sec·cmHg, and preferably not less than $10\times10^{-5}$ cm$^3$ (STP)/cm$^2$·sec·cmHg, and a ratio of the permeance for methanol vapor to that for dimethyl carbonate vapor ($P'_{MeOH}/P'_{DMC}$) is not less than 5, and preferably not less than 8, and furthermore, it has such a thermal stability that a thermal shrinkage ratio is not more than 3%, preferably not less than 2%, and particularly preferably not less than 1% in a longitudinal direction of a hollow fiber membrane when it is treated with heat at 380° C. for 30 minutes.

For this reason, by contacting hot mixed gas comprising organic compound vapor with the supply side of this asymmetric hollow fiber gas separation membrane, and allowing a specified component, preferably organic compound vapor in the mixed gas to permeate selectively toward the permeation side of the asymmetric hollow fiber gas separation membrane, a mixed gas in which the above-mentioned organic compound vapor is enriched can be separated and collected.

In the polyimide having the repeating unit of the formula (1), as the tetravalent unit based on the biphenyl structure of the formula (2) derived from tetracarboxylic acid, there may be exemplified a residue of biphenyltetracarboxylic acids such as 3,3',4,4'-biphenyltetracarboxylic acid or its acid anhydride and 2,3,3',4'-biphenyltetracarboxylic acid or its acid anhydride. The tetravalent unit based on the biphenyl structure of the formula (2) is contained in A in an amount of from 20 to 80 mol % and preferably from 25 to 75 mol %. When the amount of the tetravalent unit is too small, membrane preparation becomes difficult. Too much amount undesirably lowers the gas permeance.

As the tetravalent unit based on the diphenylhexafluoropropane structure of the formula (3), there may be exemplified a residue of diphenylhexafluoropropanes such as 2,2-bis (3,4-dicarboxyphenyl) hexafluoropropane or its acid anhydride. The tetravalent unit based on the diphenylhexafluoropropane structure of the formula (3) is contained in A in an amount of from 20 to 80 mol % and preferably 25 to 75 mol %. When the amount of the tetravalent unit is too small, the gas permeance is lowered. Too much amount undesirably lowers the mechanical strength.

As the tetravalent unit based on the phenyl structure of the formula (4), there may be exemplified a residue of pyromellitic acids such as pyromellitic acid or its acid anhydride. The tetravalent unit based on the phenyl structure of the formula (4) is contained in A in an amount of from 0 to 30 mol % and preferably from 5 to 25 mol %. The pyromellitic acids are suitably used to enhance the mechanical strength, but when the amount of the pyromellitic acids is too much, the polymer solution used for membrane preparation undesirably becomes coagulated or unstable.

As the divalent unit composed of the structure represented by formula (5) or formula (6), there may be exemplified a residue of the aromatic diamine represented by the following general formulae (11) and (12). The divalent unit is contained in R in the general formula (1) in an amount of from 30 to 70 mol % and preferably 30 to 60 mol %. The divalent unit improves the gas permeability, but too much amount possibly lowers the gas separation ratio.

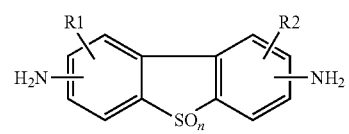

general formula (11)

Wherein, R1 and R2 are a hydrogen atom or an organic group; n is 0, 1, and 2.

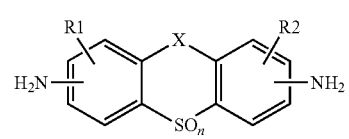

general formula (12)

Wherein, R1 and R2 are a hydrogen atom or an organic group; X is —CH$_2$— or —CO—.

As the aromatic diamine represented by the general formula (11), there may be mentioned preferably diaminodibenzothiophenes represented by the following general formula (13) that are given by selecting the number of 0 as n in the general formula (11), or diaminodibenzothiophene=5,5-dioxides represented by the following general formula (14) that are given by selecting the number of 2 as n in the general formula (11).

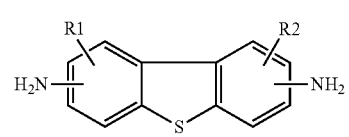

general formula (13)

Wherein, R1 and R2 are a hydrogen atom or organic group.

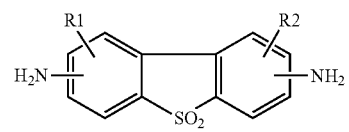

general formula (14)

Wherein, R1 and R2 are a hydrogen atom or an organic group.

The diaminodibenzothiophens of the general formula (13) may include, for example, 3,7-diamino-2,8-dimethyldibenzothiophene, 3,7-diamino-2,6-dimethyldibenzothiophene, 3,7-diamino-4,6-dimethyldibenzothiophene, 2,8-diamino-3,7-dimethyldibenzothiophene, 3,7-diamino-2,8-diethyldibenzothiophene, 3,7-diamino-2,6-diethyldibenzothiophene, 3,7-diamino-4,6-diethyldibenzothiophene, 3,7-diamino-2,8-dipropyldibenzothiophene, 3,7-diamino-2,6-dipropyldibenzothiophene, 3,7-diamino-4,6-dipropyldibenzothiophene, 3,7-diamino-2,8-dimethoxydibenzothiophene, 3,7-diamino-2,6-dimethoxydibenzothiophene, and 3,7-diamino-4,6-dimethoxydibenzothiophene.

The diaminodibenzothiophene=5,5-dioxides of the general formula (14) may include, for example, 3,7-diamino-2,8-dimethyldibenzothiophene=5,5-dioxide, 3,7-diamino-2,6-dimethyldibenzothiophene=5,5-dioxide, 3,7-diamino-4,6- dimethyldibenzothiophene=5,5-dioxide, 2,8-diamino-3,7-dimethyldibenzothiophene=5,5-dioxide, 3,7-diamino-2,8-diethyldibenzothiophene=5,5-dioxide, 3,7-diamino-2,6-diethyldibenzothiophene=5,5-dioxide, 3,7-diamino-4,6-diethyldibenzothiophene=5,5-dioxide, 3,7-diamino-2,8-dipropyldibenzothiophene=5,5-dioxide, 3,7-diamino-2,6-dipropyldibenzothiophene=5,5-dioxide, 3,7-diamino-4,6-dipropyldibenzothiophene=5,5-dioxide, 3,7-diamino-2,8-dimethoxydibenzothiophene=5,5-dioxide, 3,7-diamino-2,6-dimethoxydibenzothiophene=5,5-dioxide, and 3,7-diamino-4,6-dimethoxydibenzothiophene=5,5-dioxide.

The diaminothioxanthene-10,10-diones that are given by selecting —CH2- as X in the general formula (12) may include, for example, 3,6-diaminothioxanthene-10,10-dione, 2,7-diaminothioxanthene-10,10-dione, 3,6-diamino-2,7-diamethylthioxanthene-10,10-dione, 3,6-diamino-2,8-diethylthioxanthene-10,10-dione, 3,6-diamino-2,8-dipropylthioxanthene-10,10-dione, and 3,6-diamino-2,8-dimethoxythioxanthene-10,10-dione.

The diaminothioxanthene-9,10,10-triones that are given by selecting —CO— as X in the general formula (12) may include, for example, 3,6-diamino-thioxanthene-9,10,10-trione and 2,7-diamino-thioxanthene-9,10,10-trione.

The divalent unit based on the biphenyl structure of the formula (7) derived from diamine may be obtained by using, as diamine component, benzidines such as 2,2',5,5'-tetrachlorobenzidine, 3,3',5,5'-tetrachlorobenzidine, 3,3'-dichlorobenzidine, 2,2'-dichlorobenzidine, 2,2',3,3',5,5'-hexachlorobenzidine, 2,2',5,5'-tetrabromobenzidine, 3,3',5,5'-tetrabromobenzidine, 3,3'-dibromobenzidine, 2,2'-dibromobenzidine, and 2,2',3,3',5,5'-hexabromobenzidine and the like. Namely, they are residues of the above benzidines from which amino groups are removed. Among these, the benzidine that is given by selecting chlorine atom as Y in the formula (7) and selecting 2 as n is particularly preferable from the viewpoint of permeance and gas separation ratio. The divalent unit based on the biphenyl structure of the formula (7) is contained in R in the general formula (1) in an amount of from 30 to 70 mol % and preferably from 30 to 60 mol %. These benzidines contribute to improve the gas separation ratio, but when the amount is too much, the polymer becomes insoluble and membrane preparation becomes difficult.

The divalent unit consisting of the diphenylsulfone structure having two aromatic rings of formula (8) that are bonded at 3,3'-position and derived from the diamine component can be obtained by using 3,3'-diaminodiphenylsulfone, or 3,3'-diaminodiphenylsulfone derivatives such as 3,3'-diamino-4,4'-dimethyl-diphenylsulfone and 3,3'-diamino-4,4'-diethyl-diphenylsulfone as the diamine component. Namely, they are residues of the above 3,3'-diaminodiphenylsulfone derivative from which the amino groups are removed.

In addition, the divalent unit consisting of the m-phenylene structure that has one aromatic ring of formula (9) derived from the diamine component can be obtained by using, for example, m-phenylenediamine, or m-phenylenediamines such as m-toluoylenediamine. Namely, they are residues of m-phenylenediamines from which the amino groups are removed, and preferably the residue of m-phenylenediamine from which the amino groups are removed.

In addition, the divalent unit consisting of the diaminobenzoic acid structure that has one aromatic ring of formula (10) derived from the diamine component can be obtained by using diaminobenzoic acids as the diamine component. Namely, they are the residues of diaminobenzoic acid from which the amino groups are removed. Diaminobenzoic acids include, for example, 3,5-diaminobenzoic acid, 3,4-diaminobenzoic acid and the like. They are preferably 3,5-diaminobenzoic acid.

The asymmetric hollow fiber polyimide membrane that may particularly be preferably used in the present invention is formed of polyimide having the repeating unit of the above-mentioned formula (1) as the average of the whole, and is obtained in accordance with the above-mentioned method for production. More specifically in the above-mentioned method for production, diphenylhexafluoropropanes such as 2,2-bis(3,4-dicarboxyphenyl)hexafluoropropane or its acid anhydrides is used as at least a part, preferably the major component (not less than 50 mol %, usually not less than 55 mol %) of the tetracarboxylic acid component of the starting material so that polyimide A predominantly comprises the residue of the general formula (3). Then, the starting material components of polyimide A and polyimide B are adjusted so that polyimide has the repeating unit of the above-mentioned formula (1) as the average of the whole.

The asymmetric hollow fiber polyimide membrane is the hollow fiber membrane having the asymmetric structure consisting of the extremely thin dense layer (its preferable thickness is 0.001 to 5 μm) primarily embracing gas separation functionality and the relatively thick porous layer (its preferable thickness is 10 to 2,000 μm) supporting the dense layer, and its internal diameter is preferably 10 to 3,000 μm and its external diameter is preferably 30 to 7,000 μm. Then, it has the mechanical strength with the tensile fracture strength as a hollow fiber membrane not less than 3 kgf/mm$^2$, preferably not less than 4 kgf/mm$^2$, and more preferably not less than 5 kgf/mm$^2$, and in particular the tensile elongation at break not less than 15%, and preferably not less than 20%.

Furthermore, the asymmetric hollow fiber gas separation membrane, obtained by subjecting the above-mentioned asymmetric hollow fiber polyimide membrane to heat treatment in a temperature range of from 350 to 450° C., has the mechanical strength with the tensile fracture strength as a hollow fiber membrane not less than 3 kgf/mm$^2$, preferably not less than 4 kgf/mm$^2$, and more preferably not less than 5 kgf/mm$^2$, and in particular the tensile elongation at break not less than 10%, preferably not less than 15%, and more preferably not less than 20%; has the solvent resistance with the solvent resistance index as a hollow fiber membrane not less than 50%, preferably not less than 60%, more preferably not less than 70%, still preferably not less than 75%, and particularly preferably not less than 80%; has the thermal stability with the thermal shrinkage ratio not more than 3%, preferably not more than 2%, and particularly preferably not more than 1% in a longitudinal direction of the hollow fiber membrane when it is treated with heat at 380° C. for 30 minutes; and has the gas separation capability with the permeance for methanol vapor ($P'_{MeOH}$) at 120° C. not less than $5 \times 10^{-5}$ cm$^3$(STP)/cm$^2$·sec·cmHg, and preferably not less than $10 \times 10^{-5}$ cm$^3$(STP)/cm$^2$·sec·cmHg, and the ratio of the permeance for methanol vapor to that for dimethyl carbonate vapor ($P'_{MeOH}/P'_{DMC}$) not less than 5, and preferably not less than 8.

When the tensile elongation at break is less than 10% as a hollow fiber membrane, it is not practical because the hollow fiber membrane readily fractures or is broken as it is processed to make a module and therefore it cannot be industrially modularized. When the tensile elongation at break is not less than 10% as a hollow fiber membrane, it is practical because industrial modularization becomes easy. When the tensile elongation at break is less than 10% as a hollow fiber membrane, it is not practical because the hollow fiber membrane is readily cut in use (particularly in the case of supplying high pressure gas) and therefore the conditions of use are limited.

As previously described, the asymmetric hollow fiber polyimide membrane that may particularly be preferably used in the present invention has an improved mechanical strength and an excellent capability of gas separation as well. Thus, the asymmetric hollow fiber gas separation membrane obtained by heat treatment having the maximum temperature of 350 to 450° C. on this asymmetric hollow fiber polyimide membrane possesses a sufficient mechanical strength for practical use, which cannot be obtained by using the asymmetric hollow fiber polyimide membrane obtained by the conventional method of production. In addition, the asymmetric hollow fiber gas separation membrane obtained by heat treatment having the maximum temperature of 350 to 450° C. has a high stability to heat and it can advantageously separate a mixed gas containing organic compound vapor, and furthermore has a good resistance against organic compounds. On the other hand, it is not easy to obtain an asymmetric hollow fiber gas separation membrane that is preferably used to separate a mixed gas containing organic compound vapor when a heat treatment temperature is lower than 350° C. When the heat treatment temperature exceeds 450° C., it is not preferred because the mechanical strength of the resulting asymmetric hollow fiber gas separation membrane tends to degrade.

The hollow fiber gas separation membrane of the present invention may be preferably used for applications of separating and collecting organic vapor from mixed gas containing organic vapor such as saturated or unsaturated aliphatic hydrocarbon, aromatic hydrocarbon, halogenated hydrocarbon, ketones, alcohols, esters and carbonate esters; separating and collecting carbon dioxide gas from mixed gas containing carbon dioxide gas; separating and collecting perfluoro compound from mixed gas containing perfluoro compound; and separating and collecting organic vapor (volatile organic compounds) in the air. Furthermore by applying this separation membrane to a chemical reaction process, the utilization of the properties of this separation membrane enables enhancement in reaction efficiency and the like by, for example, shifting equilibrium toward a system of products through selective separation and elimination of one component from a reaction system.

The asymmetric hollow-fiber gas separation membrane of the present invention has an excellent mechanical strength, so that the membrane can be suitably used in a membrane module. Since the hollow-fiber gas separation membrane provides a large membrane surface area per module because of its hollow-fiber form and is exhibit excellent permselectivity and solvent resistance to organic vapors, a highly efficient separation and collection of an organic compound vapor can be attained by supplying a mixed gas containing the organic compound vapor. For example, a conventional gas separation module is fabricated as follows: approximately 100 to 100,000 tubes of hollow-fiber membranes having an appropriate length are bound together; at least one of both ends of the resulting hollow-fiber bundle is embedded and fixed into a tube sheet made of a thermosetting resin and the like while each hollow-fiber membrane is kept to be opened; and then a resulting hollow-fiber membrane element composed of at least the hollow-fiber bundle and tube sheet is accommodated in a vessel that is equipped with at least a mixed gas inlet, a permeated gas outlet, and a non-permeated gas outlet, in such a manner that the space connected to the internal side of the hollow-fiber membranes is isolated from the space connected to the external side of the hollow-fiber membranes. In this gas separation membrane module, a mixed gas is fed from the mixed gas inlet to the inside of the hollow-fiber membranes (the bore-side) or the space communicating to the outside; a specific gas component contained in the mixed gas is selectively permeated through the membrane while the mixed gas flows in contact with the hollow-fiber membranes; the permeated gas is discharged from the permeated gas outlet and the non-permeated gas that does not permeate through the membranes is discharged from the non-permeated gas outlet. In this way, gas separation is performed suitably.

FIG. 2 shows schematically an exemplary embodiment of a gas separation membrane module using the asymmetric hollow fiber gas separation membranes of the present invention and the method of use thereof.

EXAMPLES

Measuring methods used in the present invention will be explained.

<Measuring Method for Rotational Viscosity>

The solution viscosity of a polyimide solution was measured with a rotational viscometer (at a shear velocity of 1.75 sec$^{-1}$) at 100° C.

<Measurement for Degree of Polymerization>

In the present invention, the degree of polymerization can be evaluated by preliminary estimate of the relation between the solution viscosity and the number averaged degree of polymerization by using of gel permeation chromatography (GPC) or measurement of the degree of imidization by IR spectroscopy, for example, and thereafter evaluating the number averaged degree of polymerization by measuring the solution viscosity of a reaction solution. A sample having 90% or higher imidization degree was measured with GPC. A sample having imidization degree of less than 90% was measured with IR spectroscopy.

In the present invention, GPC measurement was carried out as follows. "HPLC system 800 series" supplied by JASCO Corporation was used. A single column of "Shodex KD-806M" was used at a column temperature of 40° C. An intelligent UV/visual spectrometer (at an absorption wavelength of 350 nm) was used as a detector for an unknown sample. A differential refractometer was used as a detector for a reference material (polyethylene glycol was used as the reference material). An N-methyl-2-pyrrolidone solution containing lithium chloride and phosphoric acid each in 0.05 mol/L was used as a solvent. The flow rate of the solvent was 0.5 mL/min, and the sample concentration was approximately 0.1%. "JASCO-JMBS/BORWIN" was used to input and process the measurement data. Data were input at a frequency of 2 times/sec so as to obtain a chromatogram of the sample. On the other hand, as reference materials, polyethylene glycols having molecular weights of 82250, 28700, 6450, and 1900 were used, and a calibration curve providing the relation between the retention time and molecular weight was obtained by detecting peaks from the chromatogram of these samples. The molecular weight of an unknown sample was evaluated as follows: a molecular weight Mi for each retention time was obtained from the calibration curve; a fraction ($W_i$) of a chromatogram height ($h_i$) for each retention time with respect to the total, $W_i = h_i/\Sigma h_i$, was obtained; and the number averaged molecular weight Mn was obtained from $1/\{\Sigma(W_i/M_i)\}$, and the weight average molecular weight Mw was obtained from $\Sigma(W_i M_i)$.

The number averaged degree of polymerization (N) was obtained by dividing the number averaged molecular weight (Mn) by the monomer unit molecular weight <m> that was averaged for the charged ratio of each monomer component on polymerization.

$$N = M_n / \langle m \rangle$$

Here, the monomer unit molecular weight ($\langle m \rangle$) was obtained as follows. Namely, in the case of charging plural kinds of tetracarboxylic acids (molecular weight: $m_{1,i}$, charged mol ratio: $R_{1,i}$, wherein $\Sigma R_{1,i}=1$ and $i=1, 2, 3, \ldots, n_1$) and plural kinds of diamines (molecular weight: $m_{2,j}$, charged mol ratio: $R_{2,j}$, wherein $\Sigma R_{2,j}=1$ and $j=1, 2, 3, \ldots, n_2$), the monomer unit molecular weight ($\langle m \rangle$) was obtained in accordance with the following equation.

$$\langle m \rangle = (\Sigma R_{1,i} m_{1,i} + \Sigma R_{2,j} m_{2,j}) - 36$$

<Measurement for Degree of Imidization>

The measurement for degree of imidization by IR spectroscopy was carried out using "Spectrum One" supplied by PerkinElmer Corp., by way of attenuated total reflection-Fourier transform infrared spectroscopy (ATR-FTIR). The degree of imidization ($p_I$) was obtained by dividing $A/A_I$ by $A_S/A_{SI}$, wherein $A/A_I$ is a normalized value of an absorbance (A) that corresponds to the C—N stretching vibration of imide bonding at a wavenumber of approximately 1360 cm$^{-1}$ using the absorbance ($A_I$) that corresponds to the C=C in-plane vibration of aromatic ring at a wavenumber of approximately 1500 cm$^{-1}$ as an internal standard; and $A_S/A_{SI}$ is a normalized value of an absorbance (AS) that corresponds to the C—N stretching vibration obtained in the same manner as described above for a sample obtained after 5 hour heat-treatment at 190° C., using an absorbance ($A_{SI}$) that corresponds to the C=C in-plane vibration of aromatic ring as an internal standard.

$$p_I = (A/A_I)/(A_S/A_{SI})$$

Here, the absorbance for an absorption band was evaluated by the peak intensity that was measured from the baseline connecting the bottoms on both sides of the absorption band.

By using the degree of imidization obtained above, the number averaged degree of polymerization (N) was calculated from the following equation.

$$N = (1+r)/(2r(1-p_I)+(1-r))$$

Here, r is the composition ratio of the total mols of the diamines with respect to the total mols of the tetracarboxylic acids in polyimide. In the case where the total mols of the diamine are larger than those of the tetracarboxylic acids, r is the inversed value of the resulting composition ratio, that is, r is equal to or smaller than 1 in any case. $p_I$ is the degree of imidization.

<Measuring Method for Oxygen Gas and Nitrogen Gas Permeance>

An element for the permeance evaluation having an effective length of 8 cm was fabricated by using six tubes of hollow-fiber membranes, a stainless-steel pipe, and an epoxy resin adhesive. The element was housed in a stainless-steel vessel to obtain a pensile module. To the pensile module, a standard mixed gas containing helium, oxygen, and nitrogen (30:30:40 by volume) was supplied at a constant pressure so as to measure the permeance and composition of a permeated gas. The composition was evaluated by gas chromatography. The oxygen gas and nitrogen gas permeances were calculated from the permeance and composition of the permeated gas, the pressure at which the mixed gas was supplied, and the effective membrane area. The measurement was carried out at 50° C.

<Evaluation Method for Helium Gas, Carbon Dioxide Gas, Methane Gas, SF$_6$ Gas and Nitrogen Gas with the Hollow Fiber Membrane>

The volume of permeation flow was measured by supplying helium gas at a constant pressure to the above-mentioned pencil module. The permeance of helium gas was calculated with the measured volume of permeated helium gas, supply pressure and the effective membrane area. Furthermore, carbon dioxide gas, methane gas, SF$_6$ gas and nitrogen gas were measure by a similar measurement method. These measurements were carried out at 50° C.

<Measuring Method for Organic Compound Vapor Permeance of Hollow-Fiber Membranes>

Fabrication of hollow-fiber membrane elements for evaluation: Ten tubes of hollow-fiber membranes were bound together and cut to form a hollow-fiber membrane bundle; one of the ends of the hollow-fiber membrane bundle was fixed with an epoxy resin while the end was opened; and then the other end thereof was fixed and closed with an epoxy resin so as to obtain a hollow-fiber membrane element for evaluation having an effective length of hollow-fiber membrane of 7.5 cm and an effective membrane area of 9.4 cm$^2$.

Figure 3:
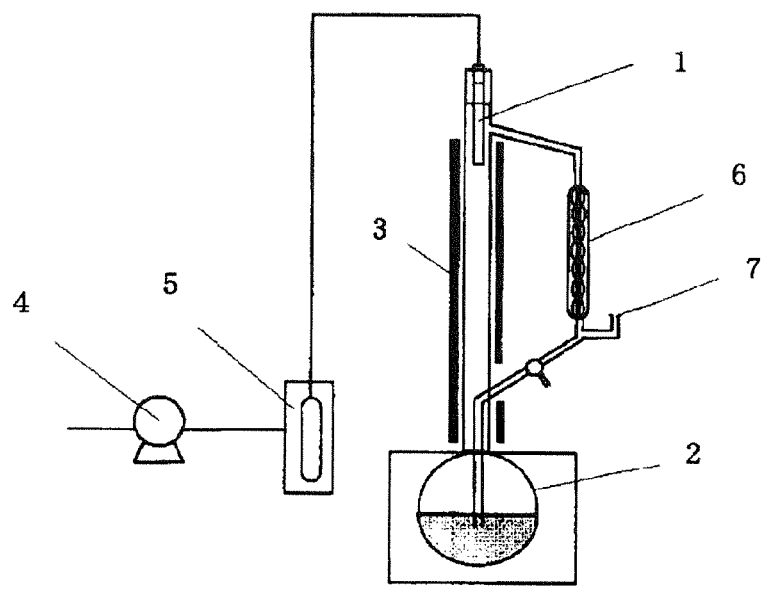
FIG. 3 is a schematic illustration of an apparatus used for measuring the gas separation capability for organic compound vapor.

The measurement for gas separation performance is explained with a schematic illustration of an apparatus for evaluating gas separation performance shown in FIG. 3. In a flask 2 equipped with a heating device, methanol (hereinafter, abbreviated as MeOH in some cases) and dimethylcarbonate (hereinafter, abbreviated as DMC in some cases) were charged in a predetermined mol ratio in such a manner that the resulting mixed vapor of methanol and dimethylcarbonate has the mol ratio approximately equal to an azeotropic composition (methanol:dimethylcarbonate=8:2 (weight ratio 7:3); they were heated to generate a mixed organic vapor. The mixed organic vapor was then super-heated with a super-heating device 3 to obtain a 120° C. mixed organic vapor having an atmospheric pressure; and then the mixed organic vapor was cooled and liquefied with a cooling device 6 so as to be circulated back to the flask 2. In the course of the above circulation process, the hollow-fiber membrane element for evaluation was not incorporated in the above-mentioned apparatus. The incorporation part was closed. After preparation of the mixed organic vapor was continued for two hours or longer, the mol ratio of methanol and dimethylcarbonate in the mixed organic vapor was analyzed and confirmed to be the above-mentioned azeotropic composition. After that, as shown in FIG. 3, a hollow fiber membrane element for evaluation 1 was incorporated into the apparatus for evaluating gas separation performance. The gas permeated side (inner side) of the hollow-fiber membranes of the element was kept at a reduced pressure of 0.7 kPa with a vacuum pump 4 so as to start gas separation. After 30 minutes or more of running-in, the permeated gas obtained from the gas permeated side of the hollow-fiber membrane element for evaluation 1 was introduced into a dry ice/methanol trap 5 for 30 minutes so as to collect the permeated gas as a condensate. The collected condensate was weighed and the concentration of each component was measured by gas chromatography so as to obtain the amount of each component contained in the permeated organic vapor. From the amount of each organic vapor component thus obtained, the permeance of each organic vapor component and the ratio of permeance were calculated. Here, sufficient amounts of methanol and dimethylcarbonate were charged, so that their mixing ratio was kept constant essentially during the measurement.

<Measurement for Tensile Fracture Strength and Tensile elongation at break of Hollow-Fiber Membranes>

The tensile fracture strength and tensile elongation at break were measured at an effective length of 20 mm and a elongation speed of 10 mm/min with a tensile testing machine. The measurement was performed at 23° C. The cross-sectional area of the hollow fibers was obtained by observing the cross-section of the hollow-fiber with an optical microscope and the dimension was measured from optical microscope image. Tensile fracture strength was determined by dividing the loads at break of the hollow fiber by the cross section area including the hollows of the hollow fiber.

<Evaluation Method for Solvent Resistance (Resistance against Organic Compounds)>

After a hollow-fiber membrane cut into 2 cm long was fully immersed and kept for 1 hour in 20 ml of para-chlorophenol kept at 80° C., the hollow-fiber membrane was taken out and the length thereof was measured. The value obtained by dividing 2 cm of the original length by the length after immersion and multiplied by 100 was determined as an index of solvent resistance.

<Evaluation for Thermal Shrinkage Ratio (Thermal Stability) of the Hollow Fiber Membrane>

The length (L) of the hollow fiber membrane was measured after the hollow fiber membrane cut in a length of 15 cm was kept in the air in an oven at 380° C. for 30 minutes, then the hollow fiber membrane was taken out and allowed to stand for 20 minutes. The thermal shrinkage ratio was determined by dividing the amount of shrinkage (15–L) cm by the length of the original hollow fiber membrane 15 cm, and multiplying it by 100. The measurement was carried out at room temperature (23° C.).

The method for producing the asymmetric hollow-fiber membranes of the present examples is explained.

<Method for Producing Asymmetric Hollow-Fiber Membranes>

The asymmetric hollow-fiber membranes used in the following examples were produced by the dry and wet spinning process. Specifically, a polyimide solution was filtered off with a 400 mesh pass-through net; the filtered solution was extruded through a hollow-fiber spinning nozzle (having a circular opening with an outside diameter of 1,000 µm and a slit width of 200 µm, and a core opening with an outside diameter of 400 µm); the extruded solution in a hollow-fiber form was passed through a nitrogen gas atmosphere, and then immersed in a coagulation liquid of a 75 wt % ethanol aqueous solution kept at 0° C. to obtain a wet fiber. The fiber was immersed in 50° C. ethanol for 2 hours to complete desolvation, and further immersed and cleaned in 70° C. isooctane for 3 hours to replace the solvent, and then dried at 100° C. for 30 minutes under an absolute dry condition. After that, the fiber was heat-treated at 270° C. for 1 hour.

<Method for Producing Asymmetric Hollow-Fiber Gas Separation Membranes>

The asymmetric hollow fiber polyimide membrane was further heat-treated at a predetermined temperature for one hour. Further, in order to condition the surface sliding property of the hollow-fiber membrane, the hollow-fiber was subjected to oil treatment with silicone oil. In this way, a hollow-fiber membrane was produced. The resulting hollow-fiber membranes, each had roughly an outside diameter of 400 µm, an inside diameter of 200 µm, and a membrane thickness of 100 µm.

Example 1

In a separable flask, 11.02 g of 6FDA, 5.47 g of s-BPDA, 6.07 g of TSN and 7.13 g of TCB were polymerized together with 137 g of PCP serving as a solvent at a reaction temperature of 190° C. for 20 hours to obtain a polyimide solution. The degree of polymerization of the polyimide in this solution was 21 (i.e., $N_A$=21). To this polyimide solution, 2.74 g of s-BPDA, 2.03 g of PMDA, 2.60 g of TSN and 3.05 g of TCB were added together with 48 g of PCP serving as a solvent (i.e., $N_B$=0.5). This multicomponent polyimide mixed solution was further polymerized and imidized at a reaction temperature of 190° C. for 32 hours to obtain a polyimide solution, in which a degree of polymerization of polyimide was 27, a rotational viscosity was 1,469 poises and a polymer concentration was 17% by weight (diamine was 1.020 parts by mol with respect to 1 part by mol of acid dianhydride as the total starting material composition).

By using this multicomponent polyimide mixed solution, the asymmetric membrane (1) was produced on the basis of the method for producing the above-mentioned asymmetric hollow fiber polyimide membrane.

The oxygen gas permeance of this hollow fiber membrane was $8.38 \times 10^{-5}$ cm$^3$(STP)/cm$^2$·sec·cmHg, the nitrogen gas permeance was $1.73 \times 10^{-5}$ cm$^3$(STP)/cm$^2$·sec·cmHg, and the ratio of permeance of oxygen gas to nitrogen gas was 4.8. In addition, the thermal shrinkage ratio was 6%.

The above-mentioned asymmetric hollow fiber membrane (1) was subjected to the heat treatment at 370° C. for one hour, and the properties of the resultant asymmetric hollow fiber gas separation membrane were measured in accordance with the above-mentioned method.

The oxygen gas permeance was $1.80 \times 10^{-5}$ cm$^3$(STP)/cm$^2$·sec·cmHg, the nitrogen gas permeance was $3.40 \times 10^{-6}$ cm$^3$(STP)/cm$^2$·sec·cmHg, and the ratio of permeance of oxygen gas to nitrogen gas was 5.3. The MeOH gas permeance was $20.6 \times 10^{-5}$ cm$^3$(STP)/cm$^2$·sec·cmHg, the DMC gas permeance was $2.4 \times 10^{-5}$ cm$^3$(STP)/cm$^2$·sec·cmHg, and the ratio of permeance of MeOH gas to DMC gas was 8.6. In addition, the tensile fracture strength was 9 kgf/mm$^2$, the tensile elongation at break was 34%, the solvent resistance index was 83%, and the thermal shrinkage ratio was 0%.

FIG. 8 also shows the scanning electron microscopic image of the tensile fracture section.

Example 2

The asymmetric membrane (1) obtained in Example 1 was subjected to the heat treatment at 400° C. for one hour, and the properties of the resultant asymmetric hollow fiber gas separation membrane were measured in accordance with the above-mentioned method.

The oxygen gas permeance of this hollow fiber membrane was $1.01 \times 10^{-5}$ cm$^3$(STP)/cm$^2$·sec·cmHg, the nitrogen gas permeance was $1.99 \times 10^{-6}$ cm$^3$(STP)/cm$^2$·sec·cmHg, and the ratio of permeance of oxygen gas to nitrogen gas was 5.1. The MeOH gas permeance of this hollow fiber membrane was $16.9 \times 10^{-5}$ cm$^3$(STP)/cm$^2$·sec·cmHg, the DMC gas permeance was $1.9 \times 10^{-5}$ cm$^3$(STP)/cm$^2$·sec·cmHg, and the ratio of permeance of MeOH gas to DMC gas was 8.9. The carbon dioxide gas permeance of this hollow fiber membrane was $4.6 \times 10^{-5}$ cm$^3$(STP)/cm$^2$·sec·cmHg, the methane gas permeance was $1.4 \times 10^{-6}$ cm$^3$(STP)/cm$^2$·sec·cmHg, and the SF$_6$ gas permeance was $5.6 \times 10^{-9}$ cm$^3$(STP)/cm$^2$·sec·cmHg. In addition, the tensile fracture strength was 13.0 kgf/mm$^2$, the tensile elongation at break was 23%, the solvent resistance index was 95%, and the thermal shrinkage ratio was 0%.

Comparative Example 1

In a separable flask, 8.21 g of s-BPDA, 11.02 g of 6FDA, 2.03 g of PMDA, 8.62 g of TSN and 10.12 g of TCB were polymerized together with 184 g of PCP serving as a solvent at a polymerization temperature of 190° C. for 18 hours to obtain the polyimide solution, in which a degree of polymerization of polyimide was 93, a rotational viscosity was 2,251 poises and a polymer concentration was 17% by weight (1.0135 parts by mol of diamine with respect to 1 part by mol of acid dianhydride).

This polyimide solution was, except that the mol ratios of acid dianhydride and diamine were slightly different, obtained by randomly polymerizing the starting material composition having basically the same proportion as that of Example 1 (i.e., $N_A=N_B=0.5$).

By using this polyimide solution, the asymmetric membrane (11) was produced on the basis of the method for producing the above-mentioned asymmetric hollow fiber polyimide membrane.

The oxygen gas permeance of this hollow fiber membrane was $4.86\times10^{-5}$ $cm^3(STP)/cm^2\cdot sec\cdot cmHg$, the nitrogen gas permeance was $0.92\times10^{-5}$ $cm^3(STP)/cm^2\cdot sec\cdot cmHg$, and the ratio of permeance of oxygen gas to nitrogen gas was 5.3.

The above-mentioned asymmetric membrane (11) was subjected to the heat treatment at 370° C. for one hour, and the properties of the resultant asymmetric hollow fiber gas separation membrane were measured in accordance with the above-mentioned method.

The oxygen gas permeance of the hollow fiber membrane was $5.15\times10^{-5}$ $cm^3(STP)/cm^2\cdot sec\cdot cmHg$, the nitrogen gas permeance was $1.13\times10^{-5}$ $cm^3(STP)/cm^2\cdot sec\cdot cmHg$, and the ratio of permeance of oxygen gas to nitrogen gas was 4.6. The MeOH gas permeance was $28.9\times10^{-5}$ $cm^3(STP)/cm^2\cdot sec\cdot cmHg$, the DMC gas permeance was $3.5\times10^{-5}$ $cm^3(STP)/cm^2\cdot sec\cdot cmHg$, and the ratio of permeance of MeOH gas to DMC gas was 8.3. In addition, the tensile fracture strength was 5.7 $kgf/mm^2$, the tensile elongation at break was 5.3%, and the solvent resistance index was 80%.

Comparative Example 2

The asymmetric membrane (11) obtained in Comparative Example 1 was subjected to the heat treatment at 400° C. for one hour, and the properties of the resultant hollow fiber membrane were measured in accordance with the above-mentioned method.

The oxygen gas permeance was $4.33\times10^{-5}$ $cm^3(STP)/cm^2\cdot sec\cdot cmHg$, the nitrogen gas permeance was $1.45\times10^{-5}$ $cm^3(STP)/cm^2\cdot sec\cdot cmHg$, and the ratio of permeance of oxygen gas to nitrogen gas was 3.0. The MeOH gas permeance of this hollow fiber membrane was $25.7\times10^{-5}$ $cm^3(STP)/cm^2\cdot sec\cdot cmHg$, the DMC gas permeance was $2.6\times10^{-5}$ $cm^3(STP)/cm^2\cdot sec\cdot cmHg$, and the ratio of permeance of MeOH gas to DMC gas was 9.9. In addition, the tensile fracture strength was 15.0 $kgf/mm^2$, the tensile elongation at break was 7.0%, and the solvent resistance index was 90%.

FIG. 7 also shows the scanning electron microscopic image of the tensile fracture section. The fracture section has a rugged granular figuration, showing that the separation membrane becomes friable.

Comparative Example 3

The asymmetric membrane (11) obtained in Comparative Example 1 was subjected to the heat treatment at 270° C. for one hour. The tensile elongation at break of the resultant asymmetric hollow fiber gas separation membrane was 13.5%. When solvent resistance was assessed, the hollow fiber membrane dissolved completely.

FIG. 6 also shows the scanning electron microscopic image of the tensile fracture section.

Comparative Example 4

The asymmetric membrane (11) obtained in Comparative Example 1 was subjected to the heat treatment at 350° C. for one hour. The tensile elongation at break of the resultant asymmetric hollow fiber gas separation membrane was 10.8%, and the solvent resistance index was 30%.

Comparative Example 5

The asymmetric membrane (11) obtained in Comparative Example 1 was subjected to the heat treatment at 375° C. for one hour. The tensile elongation at break of the resultant asymmetric hollow fiber gas separation membrane was 7%, and the solvent resistance index was 80%.

Comparative Example 6

The asymmetric membrane (11) obtained in Comparative Example 1 was subjected to the heat treatment at 450° C. for one hour. The tensile elongation at break of the resultant asymmetric hollow fiber gas separation membrane was 4.7%, and the solvent resistance index was 95%.

Comparative Example 7

The asymmetric membrane (1) obtained in Example 1 was subjected to the heat treatment at 330° C. for one hour, and the properties of the resultant asymmetric hollow fiber gas separation membrane were measured in accordance with the above-mentioned method.

The MeOH gas permeance of this hollow fiber membrane was $26.7\times10^{-5}$ $cm^3(STP)/cm^2\cdot sec\cdot cmHg$, the DMC gas permeance was $2.02\times10^{-5}$ $cm^3(STP)/cm^2\cdot sec\cdot cmHg$, and the ratio of permeance of MeOH gas to DMC gas was 13.2. In addition, the tensile fracture strength was 5.0 $kgf/mm^2$, and the tensile elongation at break was 19.6%. When solvent resistance was assessed, the hollow fiber membrane dissolved completely.

Comparative Example 8

The asymmetric membrane (1) obtained in Example 1 was subjected to the heat treatment at 500° C. for one hour, and the properties of the this hollow fiber membrane were measured in accordance with the above-mentioned method.

The MeOH gas permeance of this hollow fiber membrane was $35.7\times10^{-5}$ $cm^3(STP)/cm^2\cdot sec\cdot cmHg$, the DMC gas permeance was $16.6\times10^{-5}$ $cm^3(STP)/cm^2\cdot sec\cdot cmHg$, and the ratio of permeance of MeOH gas to DMC gas was 2.2. In addition, the tensile fracture strength was 6.9 $kgf/mm^2$, the tensile elongation at break was 2.7%, and the solvent resistance index was 95%.

Example 3

In a separable flask, 6.36 g of s-BPDA and 6.07 g of TSN were polymerized and imidized together with 171 g of PCP serving as a solvent at a reaction temperature of 190° C. for 27 hours to obtain a solution. The degree of polymerization of the polyimide in this polyimide solution was 57 (i.e., $N_A=57$). To this polyimide solution, 6.36 g of s-BPDA, 12.79 g of 6FDA, 8.10 g of TSN, 3.67 g of MASN and 1.12 g of DABA were added together with 20 g of PCP serving as a solvent (i.e., $N_A$=0.5). This multicomponent polyimide mixed solution was further polymerized and imidized at a reaction temperature of 190° C. for 19 hours to obtain a multicomponent polyimide mixed solution, in which a degree of polymerization of polyimide was 50, a rotational viscosity was 1,507 poises and a polymer concentration was 18% by weight (diamine was 1.025 parts by mol with respect to 1 part by mol of acid dianhydride as the total starting material composition).

By using this multicomponent polyimide mixed solution, the asymmetric membrane (2) was produced on the basis of the method for producing the above-mentioned asymmetric hollow fiber polyimide membrane.

The helium gas permeance of this hollow fiber membrane was $7.10 \times 10^{-4}$ cm³(STP)/cm²·sec·cmHg, the nitrogen gas permeance was $0.93 \times 10^{-5}$ cm³(STP)/cm²·sec·cmHg, and the ratio of permeance of helium gas to nitrogen gas was 76.3. In addition, the thermal shrinkage ratio was 7%.

The above-mentioned asymmetric membrane (2) was subjected to the heat treatment at 350° C. for one hour, and the properties of the resultant asymmetric hollow fiber gas separation membrane were measured in accordance with the above-mentioned method.

The MeOH gas permeance was $21.7 \times 10^{-5}$ cm³(STP)/cm²·sec·cmHg, the DMC gas permeance was $2.1 \times 10^{-5}$ cm³(STP)/cm²·sec·cmHg, and the ratio of permeance of MeOH gas to DMC gas was 10.3. In addition, the tensile fracture strength was 6.8 kgf/mm², the tensile elongation at break was 18.3%, the solvent resistance index was 85%, and the thermal shrinkage ratio was 0%.

Example 4

The asymmetric membrane (2) obtained in Example 3 was subjected to the heat treatment at 370° C. for one hour, and the properties of the resultant asymmetric hollow fiber gas separation membrane were measured in accordance with the above-mentioned method.

The MeOH gas permeance was $11.0 \times 10^{-5}$ cm³(STP)/cm²·sec·cmHg, the DMC gas permeance was $0.9 \times 10^{-5}$ cm³(STP)/cm²·sec·cmHg, and the ratio of permeance of MeOH gas to DMC gas was 12.2. In addition, the tensile fracture strength was 8.4 kgf/mm², the tensile elongation at break was 16.4%, the solvent resistance index was 87%, and the thermal shrinkage ratio was 0%.

Comparative Example 9

In a separable flask, 12.71 g of s-BPDA, 12.79 g of 6FDA, 14.17 g of TSN, 3.67 g of MASN and 1.12 g of DABA were polymerized and imidized together with 191 g of PCP serving as a solvent at a reaction temperature of 190° C. for 73 hours to obtain the polyimide solution, in which a degree of polymerization of polyimide was 49, a rotational viscosity was 1,190 poises and a polymer concentration was 18% by weight (1.025 parts by mol of diamine with respect to 1 part by mol of acid dianhydride). This polyimide solution was one in which the starting material composition having basically the same proportion as that of Example 3 has been randomly polymerized (i.e., $N_A$=$N_B$=0.5).

By using this polyimide solution, the asymmetric membrane (12) was produced on the basis of the method for producing the above-mentioned asymmetric hollow fiber polyimide membrane.

The helium gas permeance of this hollow fiber membrane was $8.24 \times 10^{-4}$ cm³(STP)/cm²·sec·cmHg, the nitrogen gas permeance was $1.11 \times 10^{-5}$ cm³(STP)/cm²·sec·cmHg, and the ratio of permeance of helium gas to nitrogen gas was 74.2.

The above-mentioned asymmetric membrane (12) was subjected to the heat treatment at 350° C. for one hour, and the properties of the resultant asymmetric hollow fiber gas separation membrane were measured in accordance with the above-mentioned method.

The MeOH gas permeance was $23.5 \times 10^{-5}$ cm³(STP)/cm²·sec·cmHg, the DMC gas permeance was $2.9 \times 10^{-5}$ cm³(STP)/cm²·sec·cmHg, and the ratio of permeance of MeOH gas to DMC gas was 8.1. In addition, the tensile fracture strength was 5.5 kgf/mm², the tensile elongation at break was 6.7%, and the solvent resistance index was 84%.

Comparative Example 10

The asymmetric membrane (12) obtained in Comparative Example 9 was subjected to the heat treatment at 370° C. for one hour, and the properties of the resultant asymmetric hollow fiber gas separation membrane were measured in accordance with the above-mentioned method.

The MeOH gas permeance was $22.9 \times 10^{-5}$ cm³(STP)/cm²·sec·cmHg, the DMC gas permeance was $2.6 \times 10^{-5}$ cm³(STP)/cm²·sec·cmHg, and the ratio of permeance of MeOH gas to DMC gas was 8.8. In addition, the tensile fracture strength was 4.1 kgf/mm², the tensile elongation at break was 5.5%, and the solvent resistance index was 85%.

Comparative Example 11

The asymmetric membrane (12) obtained in Comparative Example 9 was subjected to the heat treatment at 320° C. for one hour. The tensile elongation at break of the resultant asymmetric hollow fiber gas separation membrane was 7%, and the solvent resistance index was 34%.

Example 5

In a separable flask, 23.10 g of 6FDA, 3.66 g of TSN, 6.62 g of MASN and 2.03 g of DABA were polymerized and imidized together with 153 g of PCP serving as a solvent at a reaction temperature of 190° C. for 6 hours to obtain the polyimide A solution, in which the polymer concentration was 18% by weight. The number averaged degree of polymerization of this polyimide A, $N_A$ was 4.9.

In a separable flask, 21.18 g of s-BPDA and 20.25 g of TSN were polymerized and imidized together with 177 g of PCP serving as a solvent at a reaction temperature of 190° C. for 6 hours to obtain the polyimide B solution, in which the polymer concentration was 18% by weight. The number averaged degree of polymerization of this polyimide, $N_B$ was 51.

Then, 88 g of the above-mentioned polyimide A solution and 110 g of the above-mentioned polyimide B solution were weighed into a separable flask and mixed. This multicomponent polyimide mixed solution was further polymerized and imidized at a reaction temperature of 190° C. for 13 hours to obtain a multicomponent polyimide mixed solution, in which a rotational viscosity was 2,232 poises, and a polymer concentration was 18% by weight. The number averaged degree of polymerization of this multicomponent polyimide was 62.

By using this multicomponent polyimide mixed solution, the asymmetric membrane (3) was produced on the basis of the method for producing the above-mentioned asymmetric hollow fiber polyimide membrane.

The helium gas permeance of this hollow fiber membrane was $8.76 \times 10^{-4}$ cm³(STP)/cm²·sec·cmHg, the nitrogen gas permeance was $1.67 \times 10^{-5}$ cm³(STP)/cm²·sec·cmHg, and the ratio of permeance of helium gas to nitrogen gas was 52.5.

The above-mentioned asymmetric membrane (3) was subjected to the heat treatment at 350° C. for one hour, and the properties of the resultant asymmetric hollow fiber gas separation membrane were measured in accordance with the above-mentioned method.

The MeOH gas permeance was $17.5 \times 10^{-5}$ cm$^3$(STP)/cm$^2$·sec·cmHg, the DMC gas permeance was $1.05 \times 10^{-5}$ cm$^3$(STP)/cm$^2$·sec·cmHg, and the ratio of permeance of MeOH gas to DMC gas was 16.7. In addition, the tensile fracture strength was 5.7 kgf/mm$^2$, the tensile elongation at break was 21.9%, and the solvent resistance index was 83%.

Example 6

The asymmetric membrane (3) obtained in Example 5 was subjected to the heat treatment at 370° C. for one hour. The properties of the resultant asymmetric hollow fiber gas separation membrane were measured in accordance with the above-mentioned method.

The MeOH gas permeance was $9.6 \times 10^{-5}$ cm$^3$(STP)/cm$^2$·sec·cmHg, the DMC gas permeance was $0.39 \times 10^{-5}$ cm$^3$(STP)/cm$^2$·sec·cmHg, and the ratio of permeance of MeOH gas to DMC gas was 24.6. In addition, the tensile fracture strength was 6.3 kgf/mm$^2$, the tensile elongation at break was 15.6%, and the solvent resistance index was 87%.

Example 7

In a separable flask, 21.18 g of s-BPDA and 20.25 g of TSN were polymerized and imidized together with 177 g of PCP serving as a solvent at a reaction temperature of 190° C. for 0.5 hours to obtain the polyimide B solution, in which the polymer concentration was 18% by weight. The number averaged degree of polymerization of this polyimide, $N_B$ was 6.0.

Then, 110 g of the above-mentioned polyimide B solution and 88 g of the polyimide A solution with the number averaged degree of polymerization of 4.9 ($N_A$=4.9), which has been obtained in Example 5, were weighed into a separable flask and mixed. This multicomponent polyimide mixed solution was further polymerized and imidized at a reaction temperature of 190° C. for 19 hours to obtain a multicomponent polyimide mixed solution, in which a rotational viscosity was 1,376 poises, and a polymer concentration was 18% by weight. The number averaged degree of polymerization of this multicomponent polyimide was 57.

By using this multicomponent polyimide mixed solution, the asymmetric membrane (4) was produced on the basis of the method for producing the above-mentioned asymmetric hollow fiber polyimide membrane.

The helium gas permeance of this hollow fiber membrane was $5.54 \times 10^{-4}$ cm$^3$(STP)/cm$^2$·sec·cmHg, the nitrogen gas permeance was $0.83 \times 10^{-5}$ cm$^3$(STP)/cm$^2$·sec·cmHg, and the ratio of permeance of helium gas to nitrogen gas was 66.7.

The above-mentioned asymmetric membrane (4) was subjected to the heat treatment at 350° C. for one hour, and the properties of the resultant asymmetric hollow fiber gas separation membrane were measured in accordance with the above-mentioned method.

The MeOH gas permeance was $11.2 \times 10^{-5}$ cm$^3$(STP)/cm$^2$·sec·cmHg, the DMC gas permeance was $0.36 \times 10^5$ cm$^3$(STP)/cm$^2$·sec·cmHg, and the ratio of permeance of MeOH gas to DMC gas was 31.1. In addition, the tensile fracture strength was 8.9 kgf/mm$^2$, the tensile elongation at break was 29.1%, and the solvent resistance index was 80%.

Example 8

The asymmetric membrane (4) obtained in Example 7 subjected to the heat treatment at 370° C. for one hour, and the properties of the resultant asymmetric hollow fiber gas separation membrane were measured in accordance with the above-mentioned method.

The MeOH gas permeance was $7.2 \times 10^{-5}$ cm$^3$(STP)/cm$^2$·sec·cmHg, the DMC gas permeance was $0.23 \times 10^5$ cm$^3$(STP)/cm$^2$·sec·cmHg, and the ratio of permeance of MeOH gas to DMC gas was 31.3. In addition, the tensile fracture strength was 11.4 kgf/mm$^2$, the tensile elongation at break was 25.9%, and the solvent resistance index was 83%.

Example 9

In a separable flask, 23.10 g of 6FDA, 3.66 g of TSN, 6.62 g of MASN and 2.03 g of DABA were polymerized and imidized together with 153 g of PCP serving as a solvent at a reaction temperature of 190° C. for 29 hours to obtain the polyimide A solution, in which the polymer concentration was 18% by weight. The number averaged degree of polymerization of this polyimide A, $N_A$ was 22.

In a separable flask, 21.18 g of s-BPDA and 20.25 g of TSN were polymerized and imidized together with 177 g of PCP serving as a solvent at a reaction temperature of 190° C. for 0.25 hours to obtain the polyimide B solution, in which the polymer concentration was 18% by weight. The number averaged degree of polymerization of this polyimide B, $N_B$ was 4.5.

Then, 88 g of the above-mentioned polyimide solution A and 110 g of the above-mentioned polyimide solution B were weighed into a separable flask and mixed. This multicomponent polyimide mixed solution was further polymerized and imidized at a reaction temperature of 190° C. for 29 hours to obtain a multicomponent polyimide mixed solution, in which a rotational viscosity was 1,172 poises, and a polymer concentration was 18% by weight. The number averaged degree of polymerization of this multicomponent polyimide was 45.

By using this multicomponent polyimide mixed solution, the asymmetric membrane (5) was produced on the basis of the method for producing the above-mentioned asymmetric hollow fiber polyimide membrane.

The helium gas permeance of this hollow fiber membrane was $7.0 \times 10^{-4}$ cm$^3$(STP)/cm$^2$·sec·cmHg, the nitrogen gas permeance was $0.92 \times 10^{-5}$ cm$^3$(STP)/cm$^2$·sec·cmHg, and the ratio of permeance of helium gas to nitrogen gas was 76.1.

The above-mentioned asymmetric membrane (5) was subjected to the heat treatment at 350° C. for one hour, and the properties of the resultant asymmetric hollow fiber gas separation membrane were measured in accordance with the above-mentioned method.

The MeOH gas permeance was $17.4 \times 10^{-5}$ cm$^3$(STP)/cm$^2$·sec·cmHg, the DMC gas permeance was $0.76 \times 10^{-5}$ cm$^3$(STP)/cm$^2$·sec·cmHg, and the ratio of permeance of MeOH gas to DMC gas was 22.9. In addition, the tensile fracture strength was 6.6 kgf/mm$^2$, the tensile elongation at break was 17.0%, and the solvent resistance index was 80%.

Example 10

The asymmetric membrane (5) obtained in Example 9 was subjected to the heat treatment at 370° C. for one hour, and the properties of the resultant asymmetric hollow fiber gas separation membrane were measured in accordance with the above-mentioned method.

The MeOH gas permeance was $8.1 \times 10^{-5}$ cm$^3$(STP)/cm$^2$·sec·cmHg, the DMC gas permeance was $0.34 \times 10^{-5}$ cm$^3$(STP)/cm$^2$·sec·cmHg, and the ratio of permeance of MeOH gas to DMC gas was 23.8. In addition, the tensile fracture strength was 10.5 kgf/mm², the tensile elongation at break was 15.9%, and the solvent resistance index was 83%.

Example 11

In a separable flask, 23.10 g of 6FDA, 3.66 g of TSN, 6.62 g of MASN and 2.03 g of DABA were polymerized and imidized together with 153 g of PCP serving as a solvent at a reaction temperature of 190° C. for 0.5 hours to obtain the polyimide A solution, in which the polymer concentration was 18% by weight. The number averaged degree of polymerization of this polyimide A, $N_A$ was 2.76.

In a separable flask, 21.18 g of s-BPDA and 20.25 g of TSN were polymerized and imidized together with 177 g of PCP serving as a solvent at a reaction temperature of 190° C. for 0.2 hours to obtain the polyimide B solution, in which the polymer concentration was 18% by weight. The number averaged degree of polymerization of this polyimide B, $N_B$ was 3.1.

Then, 88 g of the above-mentioned polyimide solution A and 110 g of the above-mentioned polyimide solution B were weighed into a separable flask and mixed. This multicomponent polyimide mixed solution was further polymerized and imidized at a reaction temperature of 190° C. for 19 hours to obtain a multicomponent polyimide mixed solution, in which a rotational viscosity was 1,618 poises, and a polymer concentration was 18% by weight. The number averaged degree of polymerization of this multicomponent polyimide was 78.

By using this multicomponent polyimide mixed solution, the asymmetric membrane (6) was produced on the basis of the method for producing the above-mentioned asymmetric hollow fiber polyimide membrane.

The helium gas permeance of this hollow fiber membrane was $5.82 \times 10^{-4}$ cm³(STP)/cm²·sec·cmHg, the nitrogen gas permeance was $0.91 \times 10^{-5}$ cm³(STP)/cm²·sec·cmHg, and the ratio of permeance of helium gas to nitrogen gas was 64.0.

The above-mentioned asymmetric membrane (6) was subjected to the heat treatment at 370° C. for one hour, and the properties of the resultant asymmetric hollow fiber gas separation membrane were measured in accordance with the above-mentioned method.

The MeOH gas permeance was $7.0 \times 10^{-5}$ cm³(STP)/cm²·sec·cmHg, the DMC gas permeance was $0.24 \times 10^{-5}$ cm³(STP)/cm²·sec·cmHg, and the ratio of permeance of MeOH gas to DMC gas was 29.2. In addition, the tensile fracture strength was 8.0 kgf/mm², the tensile elongation at break was 15.1%, and the solvent resistance index was 83%.

FIG. 4 shows the relationship between the solvent resistance index and the tensile elongation at break in the cases of heat treatment on the asymmetric hollow fiber polyimide membranes which have been obtained by applying the conventional solution obtained by randomly polymerizing and imidizing tetracarboxylic acid component and diamine component to the phase inversion process as a dope solution. The relationship between the solvent resistance index and the tensile elongation at break comes to a trade-off relationship. It was impossible to obtain a hollow fiber gas separation membrane satisfying a solvent resistance index not less than 50% and at the same time a tensile elongation at break not less than 10%.

Figure 5:
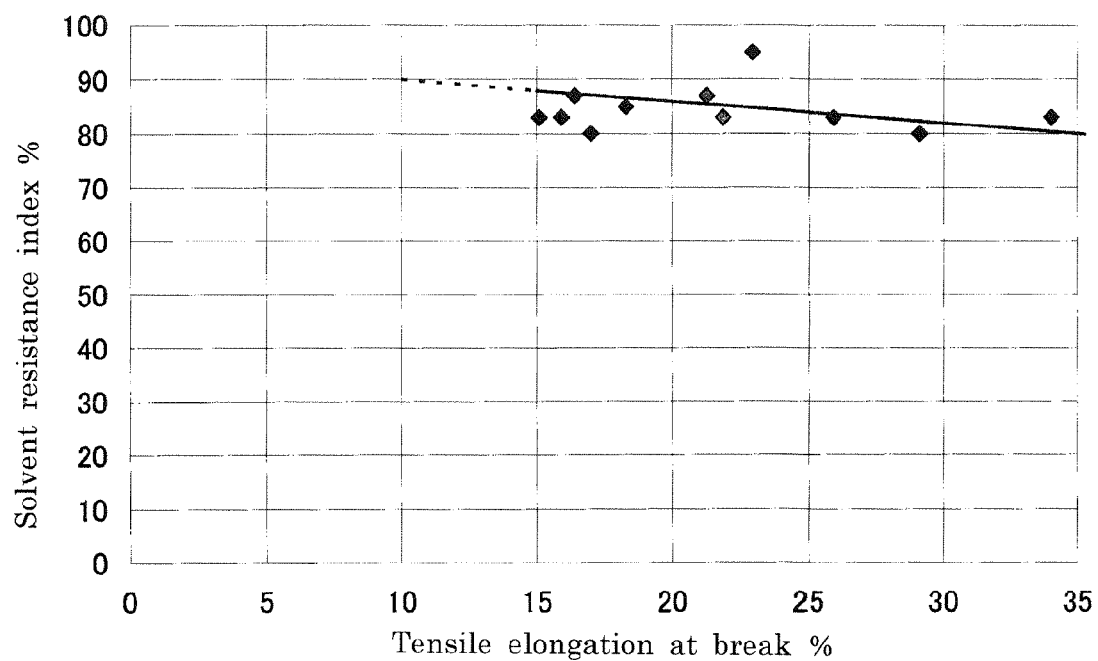
FIG. 5 is a graph to show the relationship of a solvent resistance index and tensile elongation at break for the asymmetric hollow fiber gas separation membrane of the present invention.

FIG. 5 shows the relationship between the solvent resistance index and the tensile elongation at break in the hollow fiber gas separation membrane of the present invention. In terms of the relationship between a solvent resistance index and a tensile elongation at break, quite unlike the case in which the conventional asymmetric hollow fiber polyimide membrane is subjected to heat treatment, membranes with an improved solvent resistance index also have excellent mechanical strength. The hollow fiber gas separation membrane of the present invention may be preferably used for applications of separating and collecting organic vapor from mixed gas containing organic vapor such as saturated or unsaturated aliphatic hydrocarbon, aromatic hydrocarbon, halogenated hydrocarbon, ketones, alcohols, esters and carbonate esters; separating and collecting carbon dioxide gas from mixed gas containing carbon dioxide gas; separating and collecting perfluoro compound from mixed gas containing perfluoro compound; and separating and collecting organic vapor (volatile organic compounds) in the air. Furthermore by applying this separation membrane to a chemical reaction process, the utilization of the properties of this separation membrane enables enhancement in reaction efficiency and the like by, for example, shifting equilibrium toward a system of products through selectively separating and removing one component from a reaction system.

INDUSTRIAL APPLICABILITY

In accordance with the present invention, there is provided an improved asymmetric hollow fiber gas separation membrane, which has excellent mechanical strength despite an asymmetric hollow fiber polyimide membrane has been heat treated and infusibilized to impart solvent resistance and thermal stability thereto. Since this asymmetric hollow fiber gas separation membrane is excellent in the capability of selective permeation of organic vapor, the membrane can be preferably used to separate and collect mixed gas in which particular organic compound vapor has been enriched, by means of bring the membrane into contact with the mixed gas comprising the organic compound vapor and allowing the organic compound to permeate selectively toward the permeation side of the membrane.

The invention claimed is:

1. A method for producing an asymmetric hollow fiber gas separation membrane, comprising:
    mixing a polyimide component A and a polyimide component B to prepare a multicomponent polyimide mixed solution in a combination such that $N_A$ and $N_B$ satisfy equation 1:

$$2.35 \times N_A^{-2.09} < N_B < 450 \times N_A^{-1.12} \qquad \text{(equation 1)};$$

further subjecting said multicomponent polyimide mixed solution to a polymerization-imidization reaction;
    forming an asymmetric hollow fiber polyimide membrane by a phase inversion process using said multicomponent polyimide mixed solution; and
    then, subjecting said asymmetric hollow fiber polyimide membrane to a heat treatment having a maximum temperature in a range from 350 to 450° C.,
    wherein the polyimide component A is a starting material component of a polyimide A comprising a fluorine atom in its chemical structure and/or a polymerization-imidization reaction product of said starting material component, $N_A$ is a number averaged degree of polymerization of said polyimide component A, the polyimide component B is a starting material component of a polyimide B and/or a polymerization-imidization reaction product of said starting material component, and $N_B$ is a number averaged degree of polymerization of said polyimide component B.

2. A method for producing an asymmetric hollow fiber gas separation membrane which has a mechanical strength such that a tensile elongation at break is not less than 10% as a hollow fiber membrane, wherein the asymmetric hollow fiber gas separation membrane is obtained by subjecting an asymmetric hollow fiber polyimide membrane to a heat treatment having a maximum temperature in a range from 350 to 450° C., wherein the asymmetric hollow fiber polyimide membrane is formed with a polyimide essentially having a repeating unit represented by general formula (1):

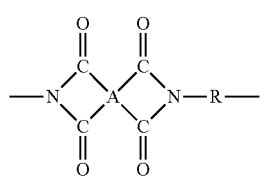

general formula (1)

wherein in the general formula (1), 20 to 80 mol % of A is a tetravalent unit based on a biphenyl structure represented by formula (2), 20 to 80 mol % of A is a tetravalent unit based on a diphenylhexafluoropropane structure represented by formula (3), and 0 to 30 mol % of A is a tetravalent unit based on a phenyl structure represented by formula (4); and in the general formula (1), 30 to 70 mol % of R is a divalent unit represented by formula (5) and/or formula (6), and 30 to 70 mol % of R is a divalent unit having one or two aromatic rings other than formula (5) or (6),

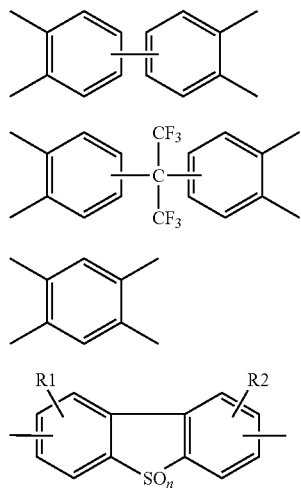

formula (2)

formula (3)

formula (4)

formula (5)

wherein, R1 and R2 are a hydrogen atom or an organic group, and n is 0, 1 or 2,

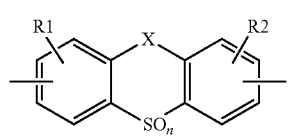

formula (6)

wherein, R1 and R2 are a hydrogen atom or an organic group, X is —CH$_2$— or —CO—, and n is 0, 1 or 2,
the method, comprising:
mixing a polyimide component A and a polyimide component B to prepare a multicomponent polyimide mixed solution in a combination such that N$_A$ and N$_B$ satisfy equation 1 described below:

$$2.35 \times N_A^{-2.09} < N_B < 450 \times N_A^{-1.12}$$ (equation 1);

wherein, the multicomponent polyimide mixed solution in which said polyimide component A and a polyimide component B are mixed contains A and R in said general formula (1), wherein the tetravalent unit based on a diphenylhexafluoropropane structure represented by said formula (3) is predominantly contained in said polyimide component A, further subjecting said multicomponent polyimide mixed solution to a polymerization-imidization reaction, forming an asymmetric hollow fiber polyimide membrane by a phase inversion process using said multicomponent polyimide mixed solution, and then, subjecting said asymmetric hollow fiber polyimide membrane to a heat treatment having a maximum temperature in a range from 350 to 450° C., wherein the polyimide component A is a starting material component of a polyimide A comprising a fluorine atom in its chemical structure and/or a polymerization-imidization reaction product of said starting material component, N$_A$ is a number averaged degree of polymerization of said polyimide component A, the polyimide component B is a starting material component of a polyimide B and/or a polymerization-imidization reaction product of said starting material component, and N$_B$ is a number averaged degree of polymerization of said polyimide component B.

3. The method for producing the asymmetric hollow fiber gas separation membrane according to claim 2, wherein the divalent unit, as R in the general formula (1), having one or two aromatic rings other than formula (5) or (6) is one or more units selected from the group consisting of formulae (7) to (10):

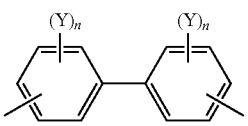

formula (7)

wherein, Y is chlorine atom or bromine atom, and n is 1 to 3,

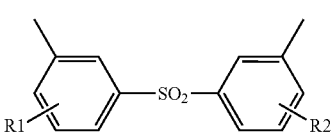

formula (8)

wherein, R1 and R2 are a hydrogen atom or an organic group,

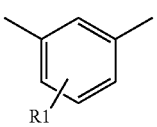

formula (9)

wherein, R1 is a hydrogen atom or an organic group,

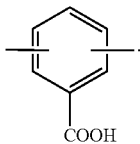

formula (10)

4. The method for producing the asymmetric hollow fiber gas separation membrane according to claim 2, wherein the divalent unit, as R in the general formula (1), having one or two aromatic rings other than formula (5) or (6) is a divalent unit based on a biphenyl structure of formula (7):

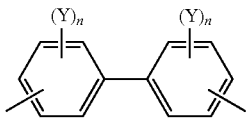

formula (7)

wherein, Y is chlorine atom or bromine atom, and n is 1 to 3.

5. The method for producing the asymmetric hollow fiber gas separation membrane according to claim 2, wherein said membrane has a solvent resistance such that a solvent resistance index is not less than 50% as a hollow fiber membrane.

6. The method for producing the asymmetric hollow fiber gas separation membrane according to claim 2, wherein the asymmetric hollow fiber gas separation membrane has a thermal stability such that a thermal shrinkage ratio is not more than 3% in a longitudinal direction of a hollow fiber membrane when treated with heat at 380° C. for 30 minutes.

7. The method for producing the asymmetric hollow fiber gas separation membrane according to claim 2, wherein the asymmetric hollow fiber gas separation membrane has such a gas separation capability that a permeance for methanol vapor ($P'_{MeOH}$) at 120° C. is not less than $5\times10^{-5}$ cm$^3$(STP)/cm$^2$·sec·cmHg, and a ratio of the permeance for methanol vapor to that for dimethyl carbonate vapor ($P'_{MeOH}/P'_{DMC}$) is not less than 5.

8. An asymmetric hollow fiber gas separation membrane consisting essentially of an asymmetric hollow fiber polyimide membrane produced according to the method of claim 2, the membrane having such a mechanical strength that a tensile elongation at break is not less than 10% as a hollow fiber membrane, a solvent resistance such that a solvent resistance index is not less than 50% as a hollow fiber membrane, a thermal stability such that a thermal shrinkage ratio is not more than 3% in a longitudinal direction of a hollow fiber membrane when treated with heat at 380° C. for 30 minutes, and a gas separation capability such that a permeance for methanol vapor ($P'_{MeOH}$) at 120° C. is not less than $5\times10^{-5}$ cm$^3$ (STP)/cm$^2$·sec·cmHg, and a ratio of the permeance for methanol vapor to that for dimethyl carbonate vapor ($P'_{MeOH}/P'_{DMC}$) is not less than 5.

* * * * *